(12) United States Patent
Walsh et al.

(10) Patent No.: US 10,306,047 B2
(45) Date of Patent: May 28, 2019

(54) MECHANISM FOR PROVIDING USER-PROGRAMMABLE BUTTON

(71) Applicant: Apple Inc., Cupertino, CA (US)

(72) Inventors: Robert Walsh, Sunnyvale, CA (US); Shailesh Rathi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 160 days.

(21) Appl. No.: 14/866,836

(22) Filed: Sep. 25, 2015

(65) Prior Publication Data

US 2016/0248897 A1 Aug. 25, 2016

Related U.S. Application Data

(60) Provisional application No. 62/119,694, filed on Feb. 23, 2015.

(51) Int. Cl.

| *H04M 1/72* | (2006.01) |
| --- | --- |
| *H04B 1/38* | (2015.01) |
| *H04L 12/24* | (2006.01) |
| *H04L 29/08* | (2006.01) |
| *H04M 1/725* | (2006.01) |
| *H04B 1/3822* | (2015.01) |
| *B60K 37/06* | (2006.01) |
| *G06F 3/023* | (2006.01) |

(Continued)

(52) U.S. Cl.
CPC ......... *H04M 1/72533* (2013.01); *B60K 35/00* (2013.01); *B60K 37/06* (2013.01); *G06F 3/0238* (2013.01); *G06F 3/0481* (2013.01); *H04B 1/3822* (2013.01); *H04L 41/22* (2013.01); *H04L 67/327* (2013.01); *B60K 2350/1016* (2013.01)

(58) Field of Classification Search
CPC . H04M 1/72533; H04M 1/725; H04L 67/327; H04L 41/22; H04L 12/24; H04L 29/08; H04B 1/3822; B60K 37/06; B60K 2350/1016; G06F 3/0238; G06F 3/0481
See application file for complete search history.

(56) References Cited

U.S. PATENT DOCUMENTS

| 5,483,261 A | 1/1996 | Yasutake |
| 5,488,204 A | 1/1996 | Mead et al. |
| 5,825,352 A | 10/1998 | Bisset et al. |

(Continued)

FOREIGN PATENT DOCUMENTS

| DE | 10237725 A1 | 2/2004 | |
| EP | 2978165 A1 * | 1/2016 | ............. G05B 15/02 |

(Continued)

OTHER PUBLICATIONS

Notice of Allowance dated Mar. 23, 2017, for U.S. Appl. No. 14/209,815, filed Mar. 13, 2014, five pages.

(Continued)

*Primary Examiner* — Pablo N Tran

(74) *Attorney, Agent, or Firm* — Morrison and Foerster LLP

(57) ABSTRACT

Embodiments of the disclosure provide an intuitive way for a first electronic device (e.g., a head unit) to request context information from a second electronic device (e.g., a phone or tablet), and to store the context information in association with an affordance (e.g., such as a physical or virtual button on the head unit) so that the context can be later recalled in response to input on the affordance.

45 Claims, 36 Drawing Sheets

(51) Int. Cl.
*G06F 3/0481* (2013.01)
*B60K 35/00* (2006.01)

(56) References Cited

U.S. PATENT DOCUMENTS

| | | | |
|---|---|---|---|
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,139,722 B2 | 11/2006 | Perrella et al. | |
| 7,184,064 B2 | 2/2007 | Zimmerman et al. | |
| 7,663,607 B2 | 2/2010 | Hotelling et al. | |
| 8,411,040 B2 * | 4/2013 | Waeller | B60K 35/00 178/18.01 |
| 8,479,122 B2 | 7/2013 | Hotelling et al. | |
| 8,604,921 B2 * | 12/2013 | Distler | B60K 35/00 340/461 |
| 8,731,772 B2 * | 5/2014 | Kuenzner | B60K 37/06 340/438 |
| 8,862,308 B2 * | 10/2014 | Kuenzner | B60K 37/06 345/172 |
| 8,862,995 B1 | 10/2014 | Kuhne et al. | |
| 9,719,797 B2 | 8/2017 | Fino et al. | |
| 2004/0226775 A1 | 11/2004 | Takatama et al. | |
| 2006/0197753 A1 | 9/2006 | Hotelling | |
| 2007/0242050 A1 * | 10/2007 | Kuenzner | B60K 37/06 345/172 |
| 2009/0125228 A1 | 5/2009 | Dicke et al. | |
| 2010/0131844 A1 | 5/2010 | Wohlert | |
| 2010/0145694 A1 | 6/2010 | Ju et al. | |
| 2010/0153111 A1 | 6/2010 | Hirai et al. | |
| 2010/0204915 A1 | 8/2010 | Kuenzner | |
| 2011/0035223 A1 | 2/2011 | Schiller | |
| 2011/0257973 A1 * | 10/2011 | Chutorash | G01C 21/3661 704/235 |
| 2012/0046020 A1 | 2/2012 | Tomasin | |
| 2012/0110449 A1 | 5/2012 | Frey | |
| 2012/0110616 A1 | 5/2012 | Kilar et al. | |
| 2012/0179833 A1 | 7/2012 | Kenrick et al. | |
| 2012/0295764 A1 | 11/2012 | Brammer | |
| 2013/0200991 A1 | 8/2013 | Ricci et al. | |
| 2014/0278072 A1 | 9/2014 | Fino et al. | |
| 2015/0160798 A1 * | 6/2015 | Kuenzner | B60K 37/06 715/841 |
| 2017/0314958 A1 | 11/2017 | Fino et al. | |

FOREIGN PATENT DOCUMENTS

| | | | | |
|---|---|---|---|---|
| JP | 2000-163031 A | 6/2000 | | |
| JP | 2002-342033 A | 11/2002 | | |
| WO | WO-2010/052113 A1 | 5/2010 | | |
| WO | WO-2014/107513 A2 | 7/2014 | | |
| WO | WO-2014/107513 A3 | 7/2014 | | |
| WO | WO 2014107513 A2 * | 7/2014 | | B60K 37/06 |
| WO | WO 2017001016 A1 * | 1/2017 | | B60K 35/00 |

OTHER PUBLICATIONS

International Search Report dated May 9, 2016, for PCT Application No. PCT/US2016/018974, filed Feb. 22, 2016, six pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

U.S. Appl. No. 12/207,316, filed Sep. 9, 2008, by W. Bull et al.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Final Office Action dated Nov. 4, 2016, for U.S. Appl. No. 14/209,815, filed Mar. 13, 2014, 19 pages.

Non-Final Office Action dated Oct. 1, 2015, for U.S. Appl. No. 14/209,815, filed Mar. 13, 2014, 13 pages.

* cited by examiner

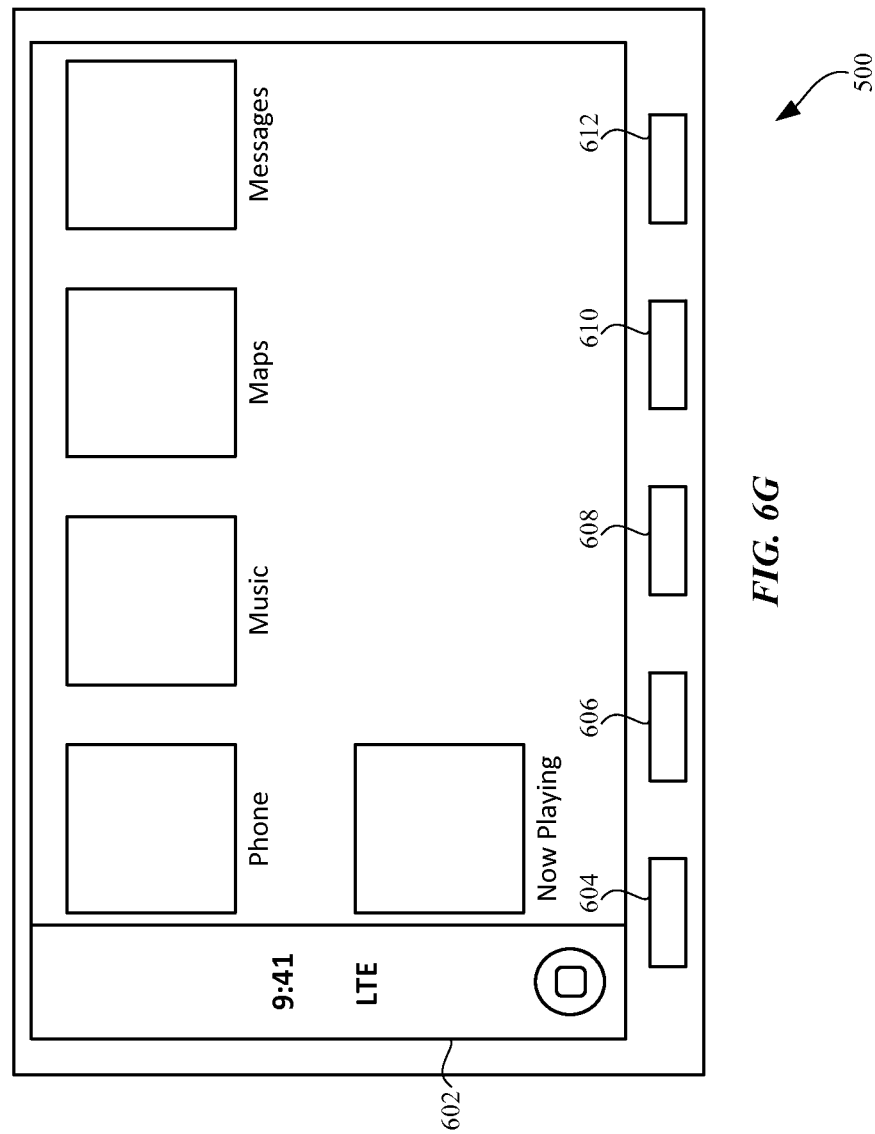

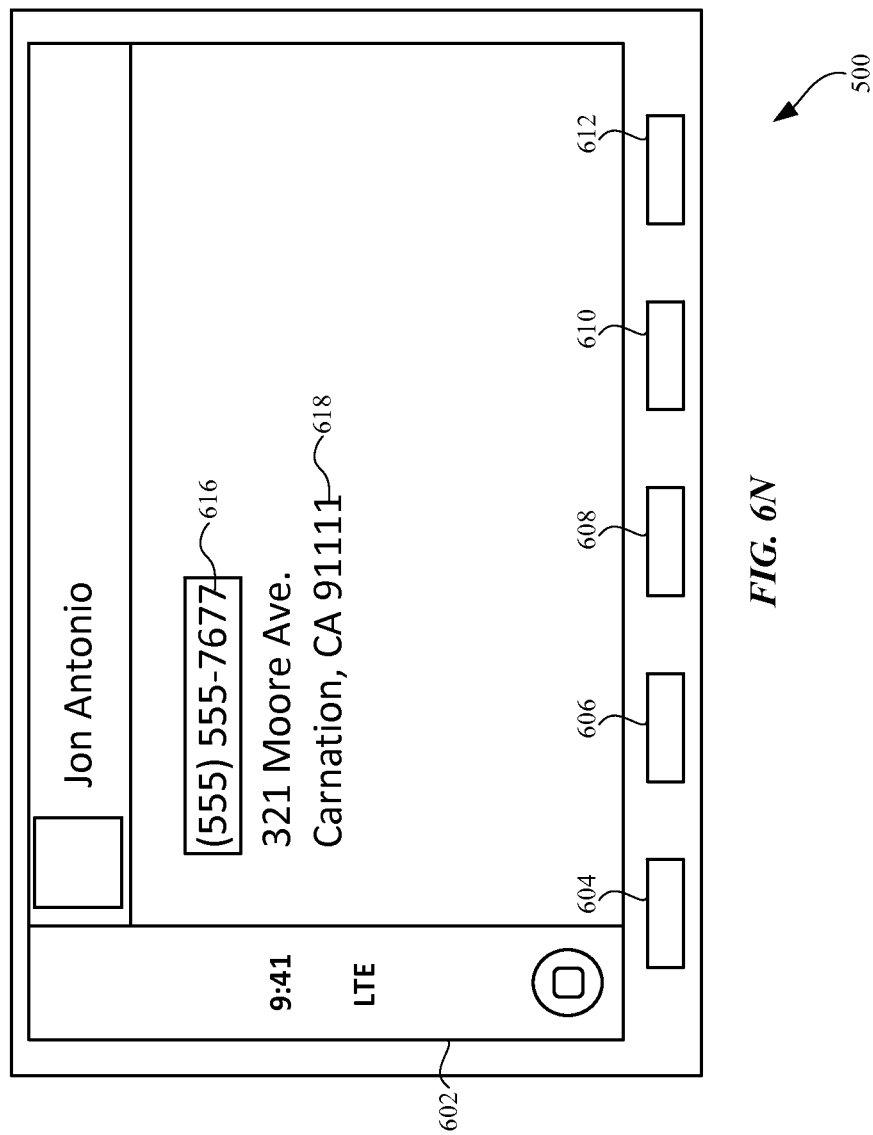

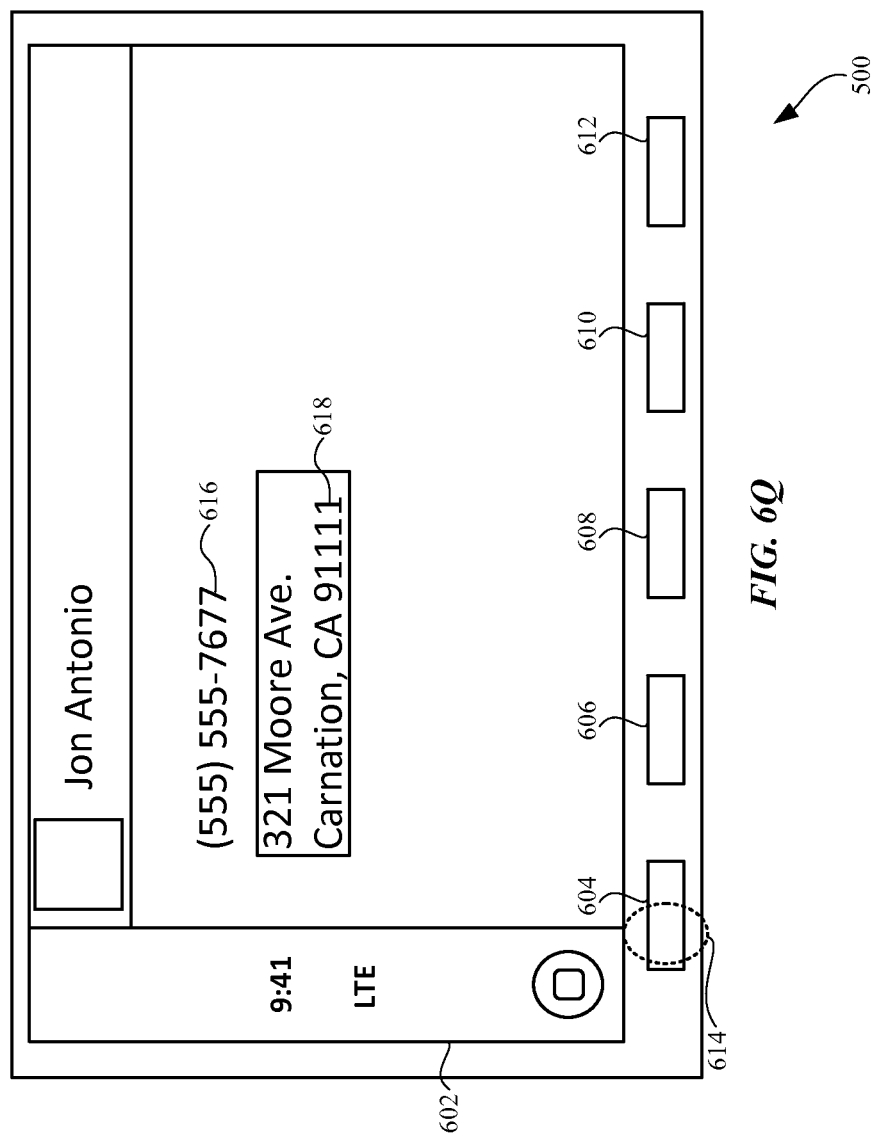

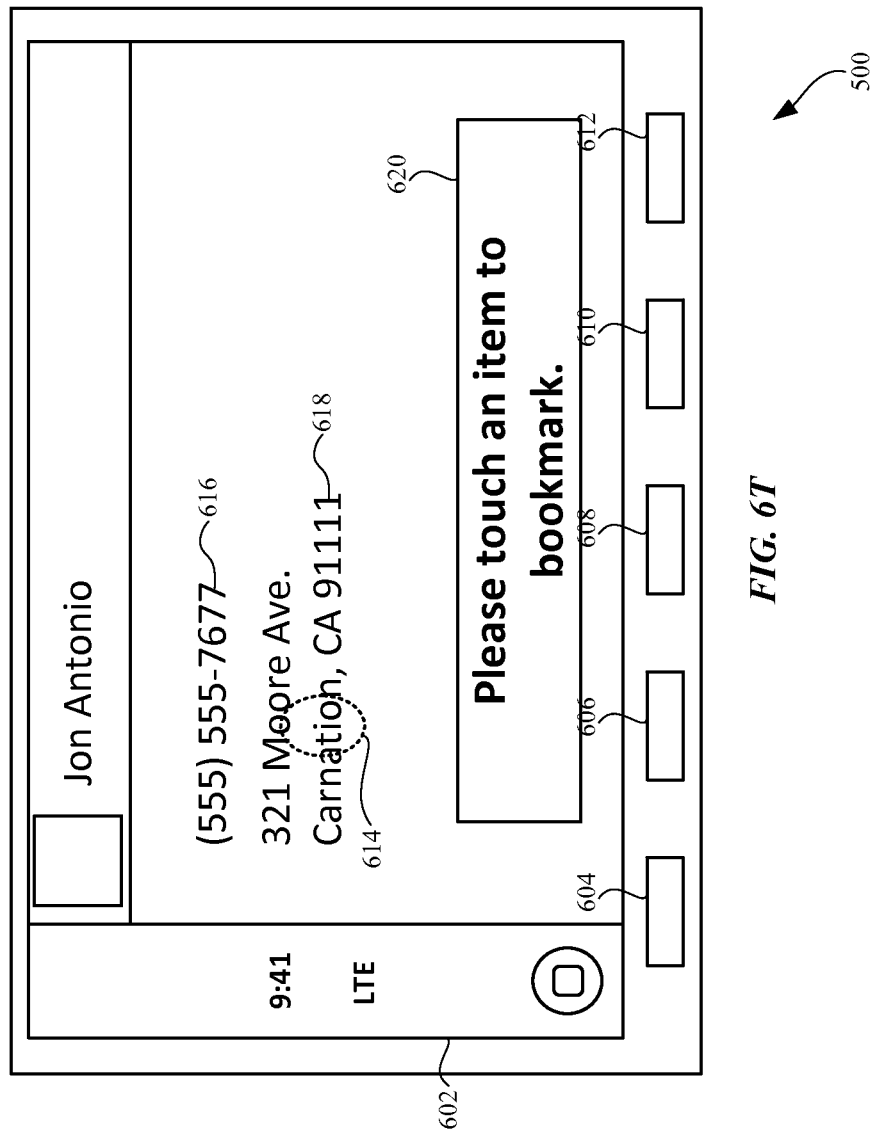

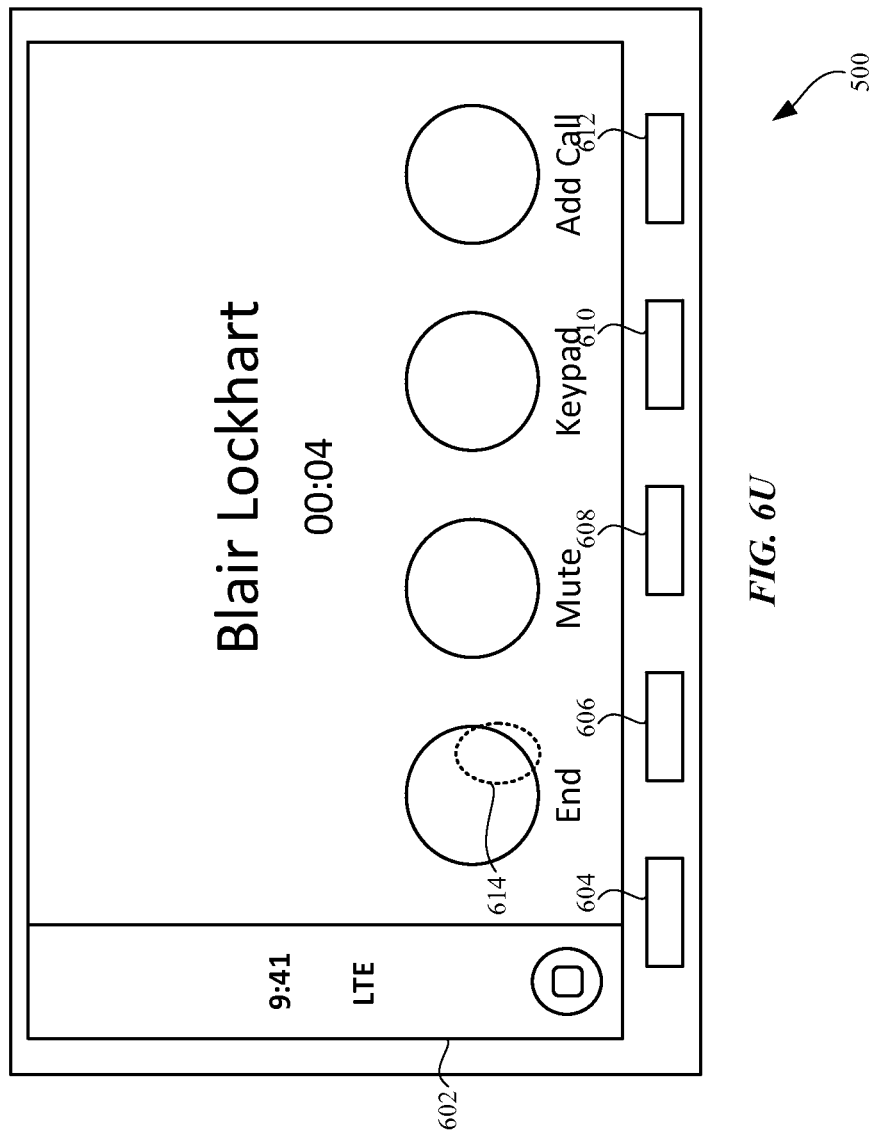

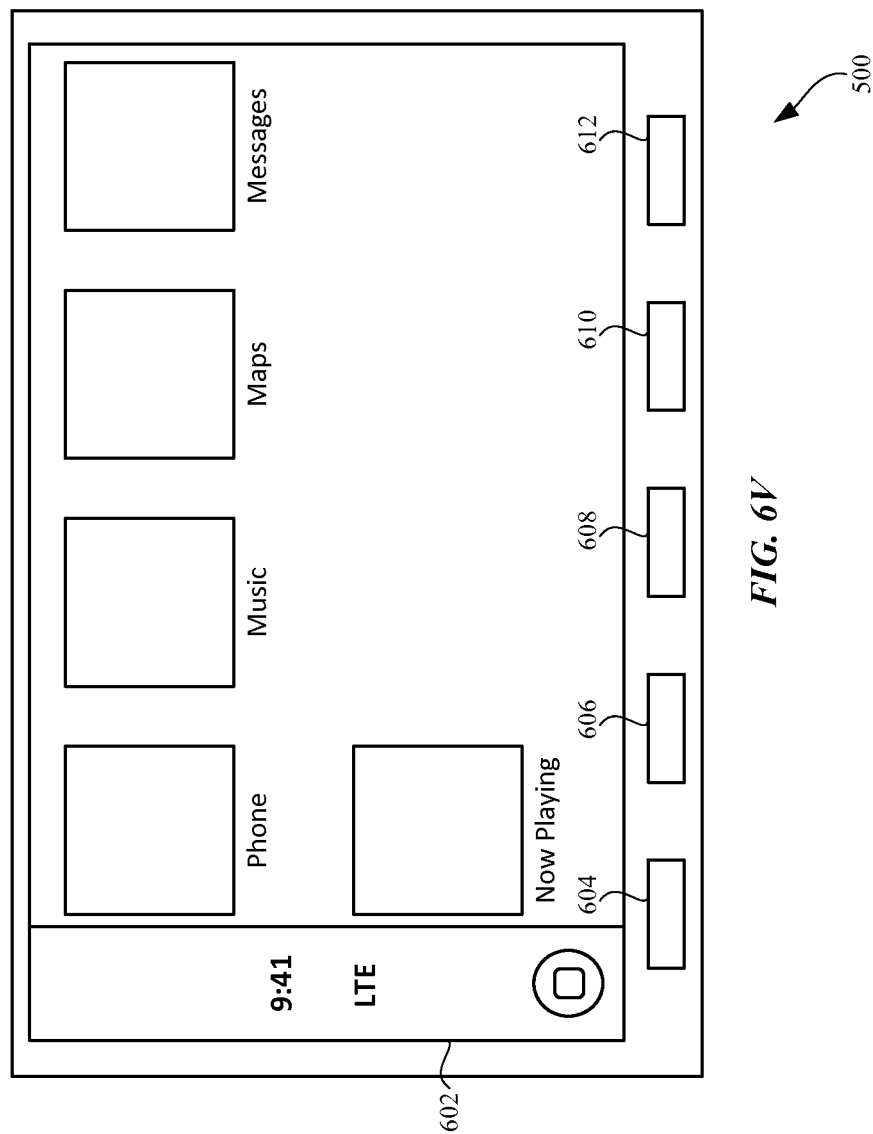

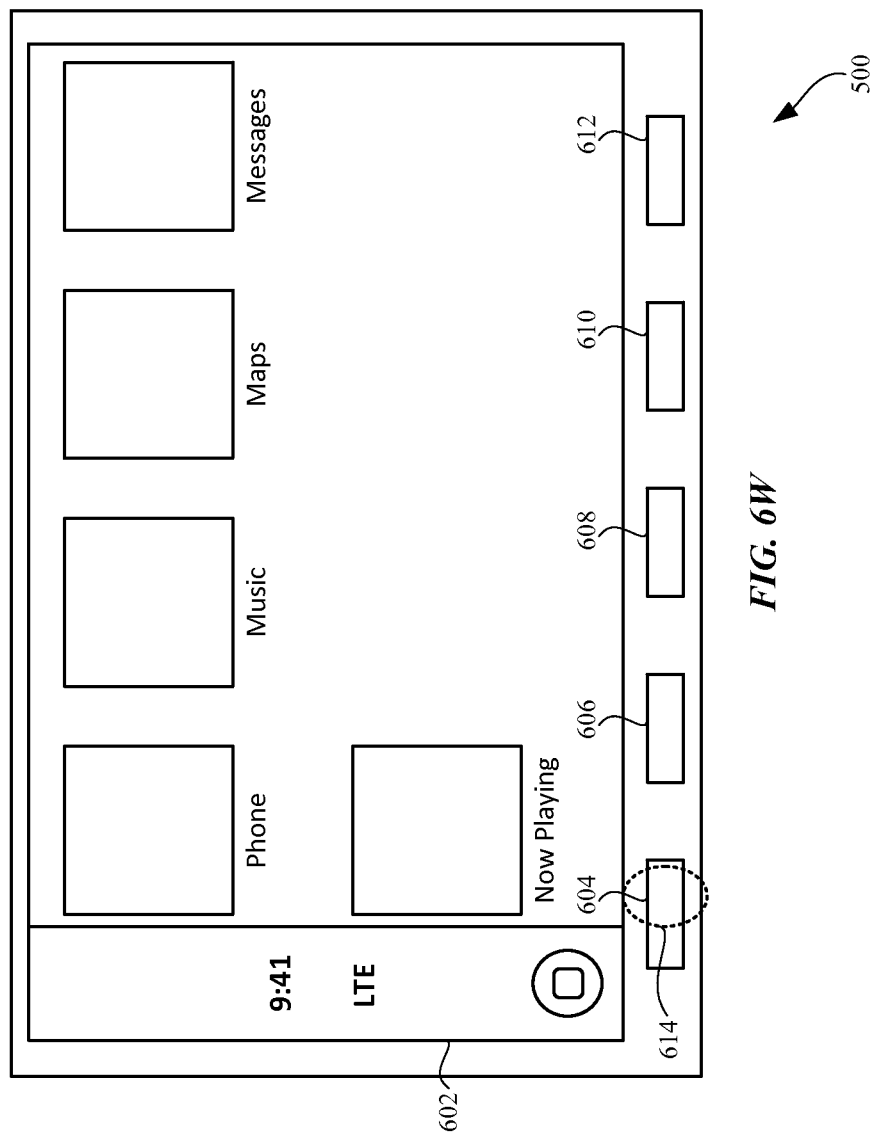

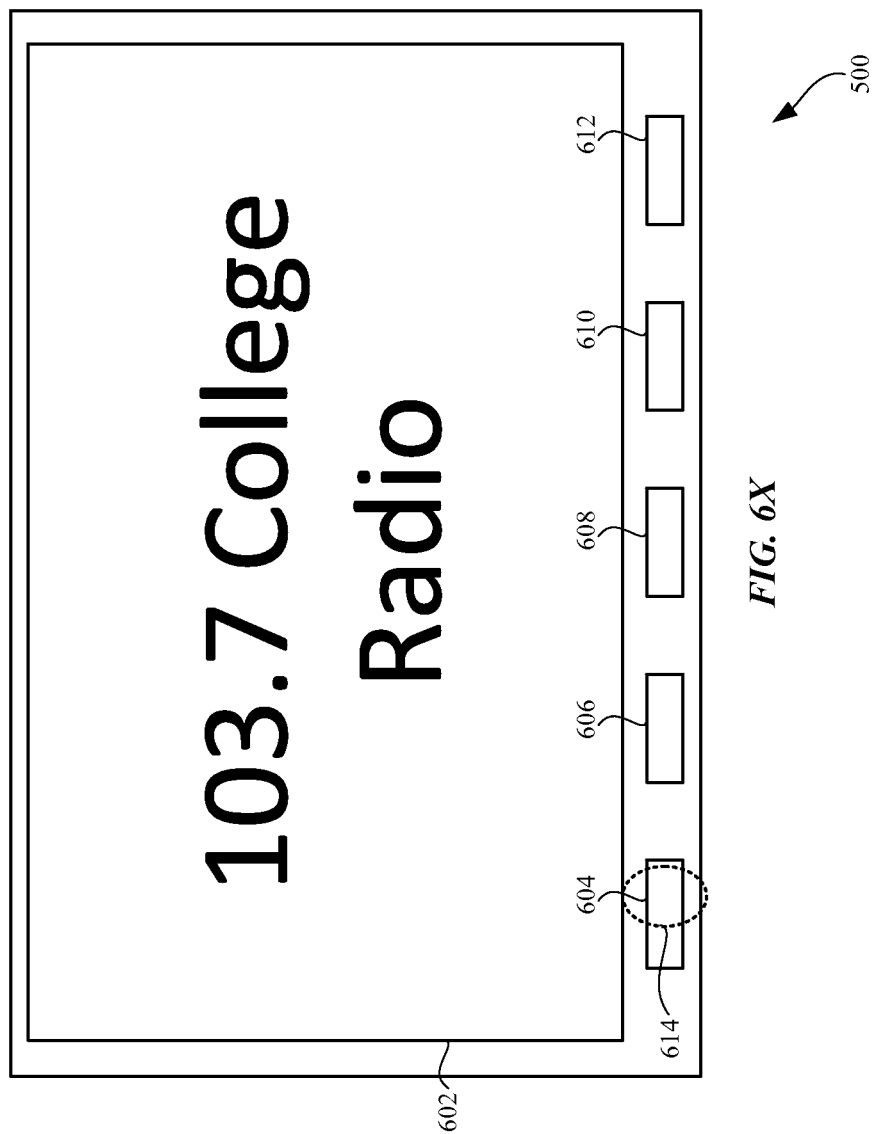

(1)

MECHANISM FOR PROVIDING USER-PROGRAMMABLE BUTTON

CROSS-REFERENCE TO RELATED APPLICATIONS

This application is a Non Provisional Application of U.S. Provisional Application No. 62/119,694, filed Feb. 23, 2015 of which is hereby incorporated by reference in its entirety for all purposes.

FIELD OF THE DISCLOSURE

The present disclosure relates generally to user interfaces for interacting with multiple electronic devices in communication with each other.

BACKGROUND OF THE DISCLOSURE

A head unit in an automobile audio system provides a user interface for accessing functionality including navigation, radio stations, streaming music, etc. However, such systems require navigating through multiple menus and screens before accessing desired functionality.

SUMMARY OF THE DISCLOSURE

A head unit in an automobile audio system provides one or more affordances (e.g., physical buttons or virtual buttons on a touch screen) that are programmable for functionality of the audio system. For example, an affordance can be programmed to bookmark a particular radio station on the head unit by pressing and holding the affordance while the radio is tuned to the particular radio station. Then, by pressing the affordance later, the particular radio station can be automatically recalled. Further, modern head units are capable of utilizing the functionality of portable multifunction devices such as phones and tablets. There is a need to provide a fast, efficient, and intuitive way for users to use affordances of a head unit to bookmark functionality on a connected phone or tablet. The embodiments described below provide an intuitive way for a first electronic device (e.g., a head unit) to request context information from a second electronic device (e.g., a phone or tablet), and to store the context information in association with an affordance (e.g., such as a physical or virtual button on the head unit) so that the context can be later recalled in response to input on the affordance.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1A:
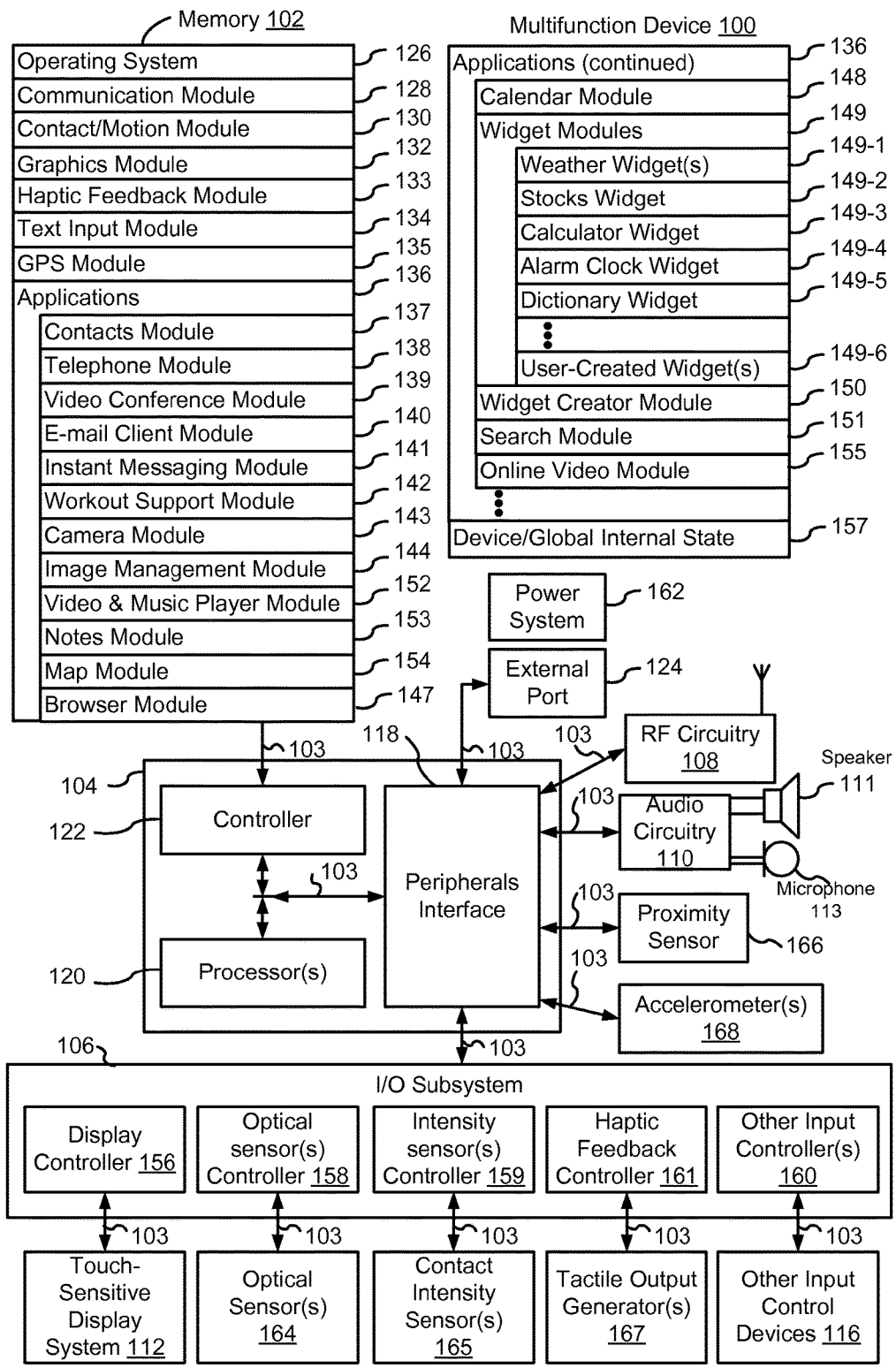
FIG. 1A is a block diagram illustrating a multifunction device with a touch-sensitive display in accordance with some embodiments.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for video conferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
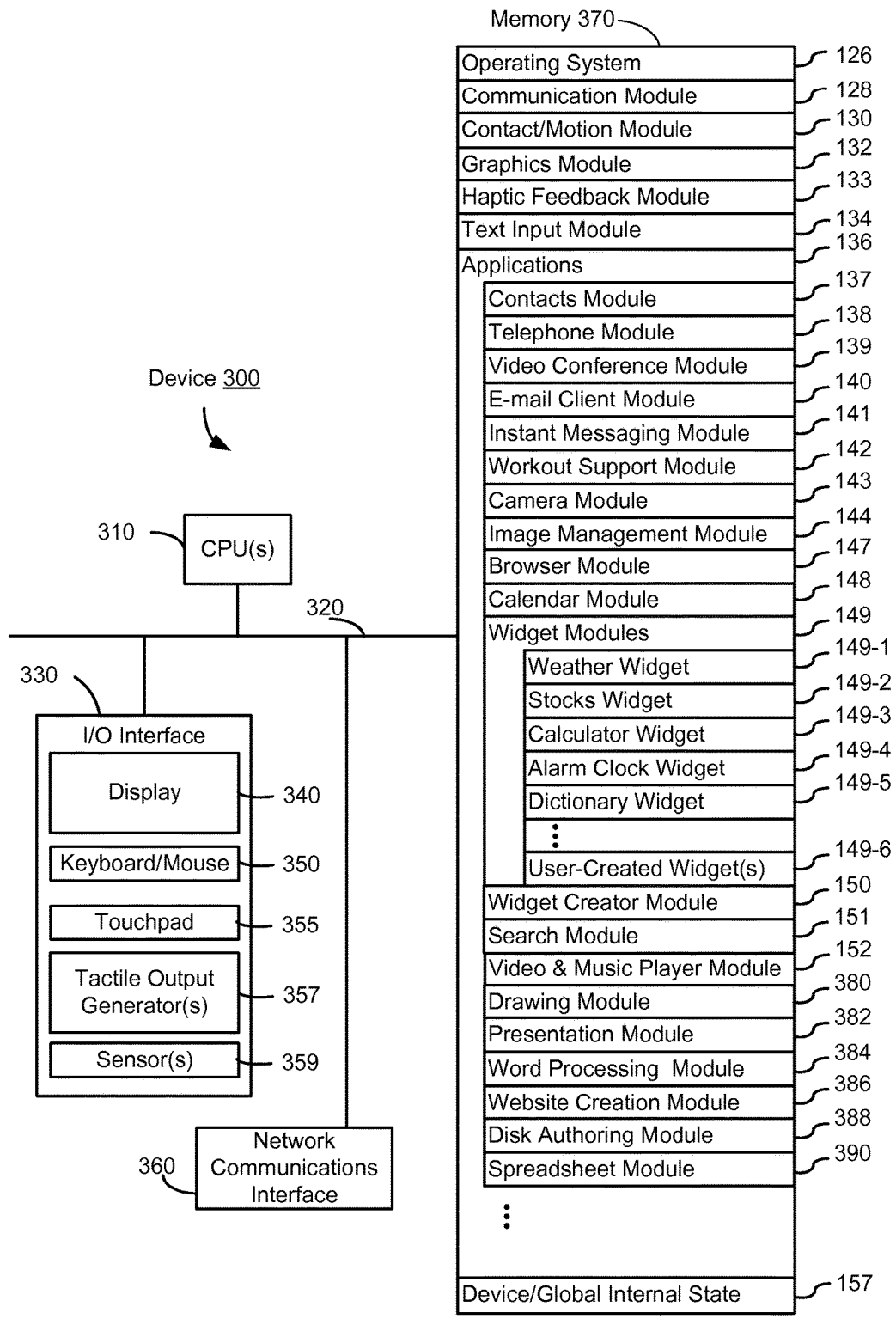
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns and intensities. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;

video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154;
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad (whether included in device 100 or on a separate device, such as an input device). By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
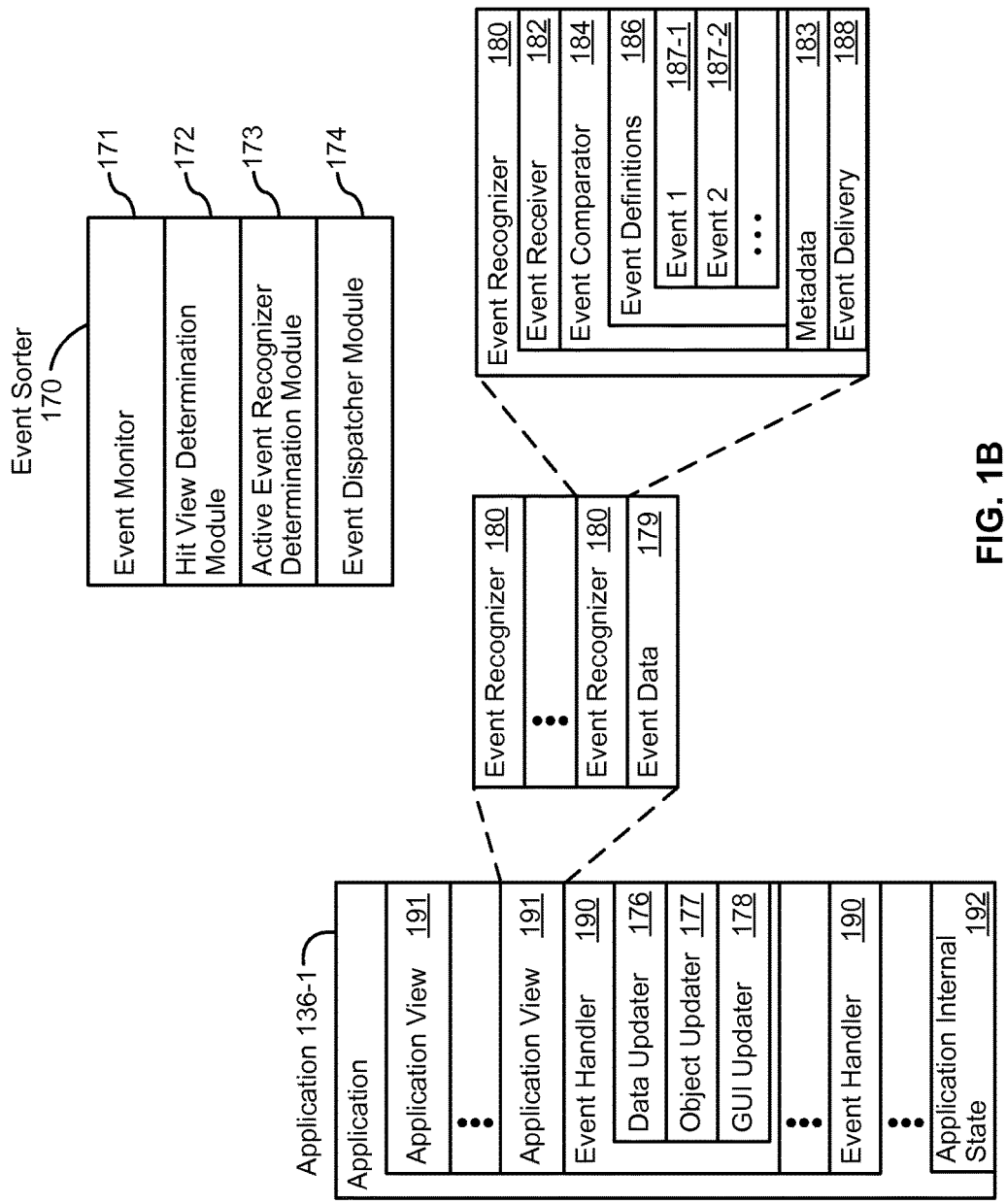
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays and/or touchpads also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
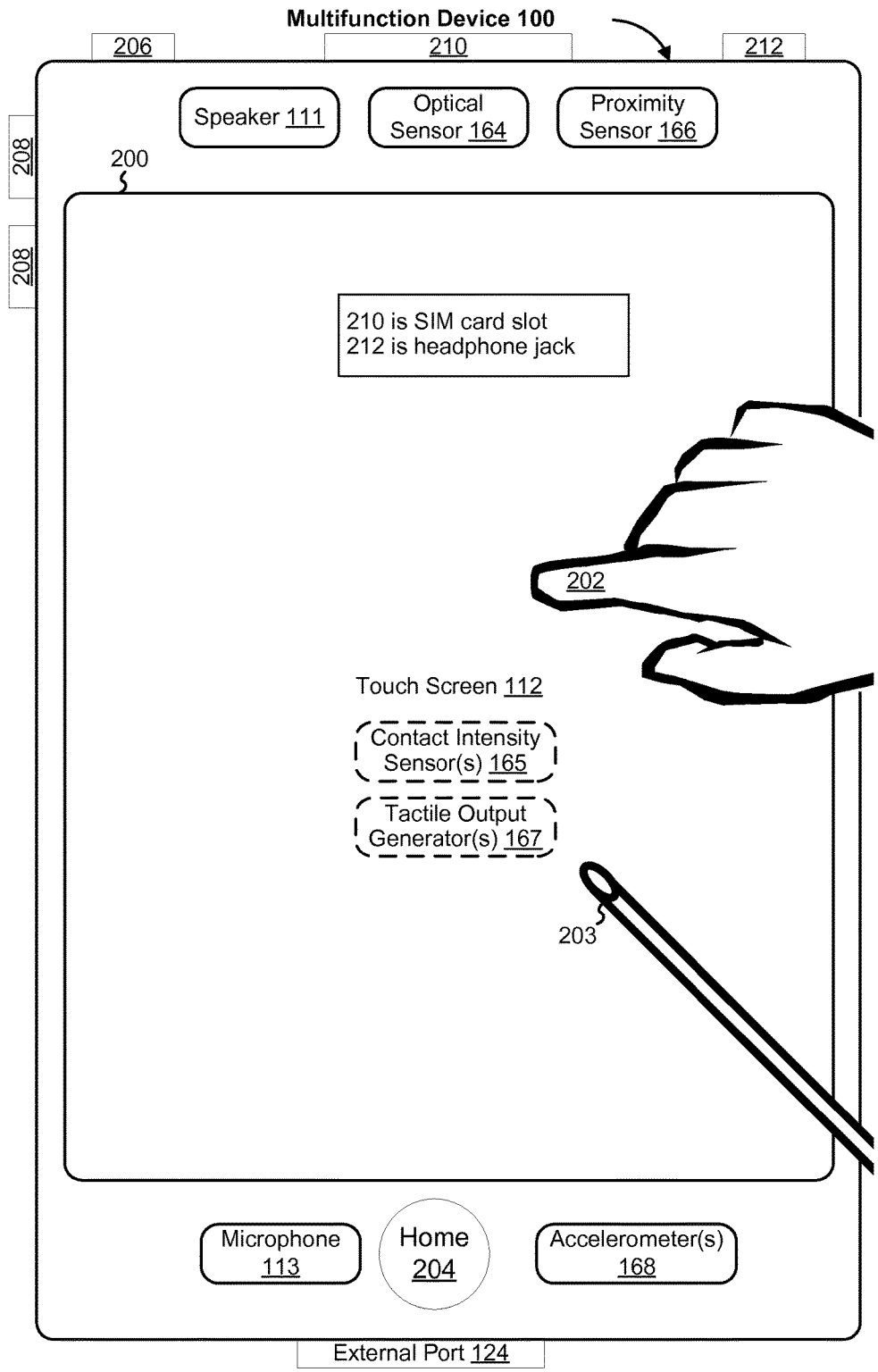
FIG. 2 illustrates a multifunction device having a touch screen in accordance with some embodiments.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 4:
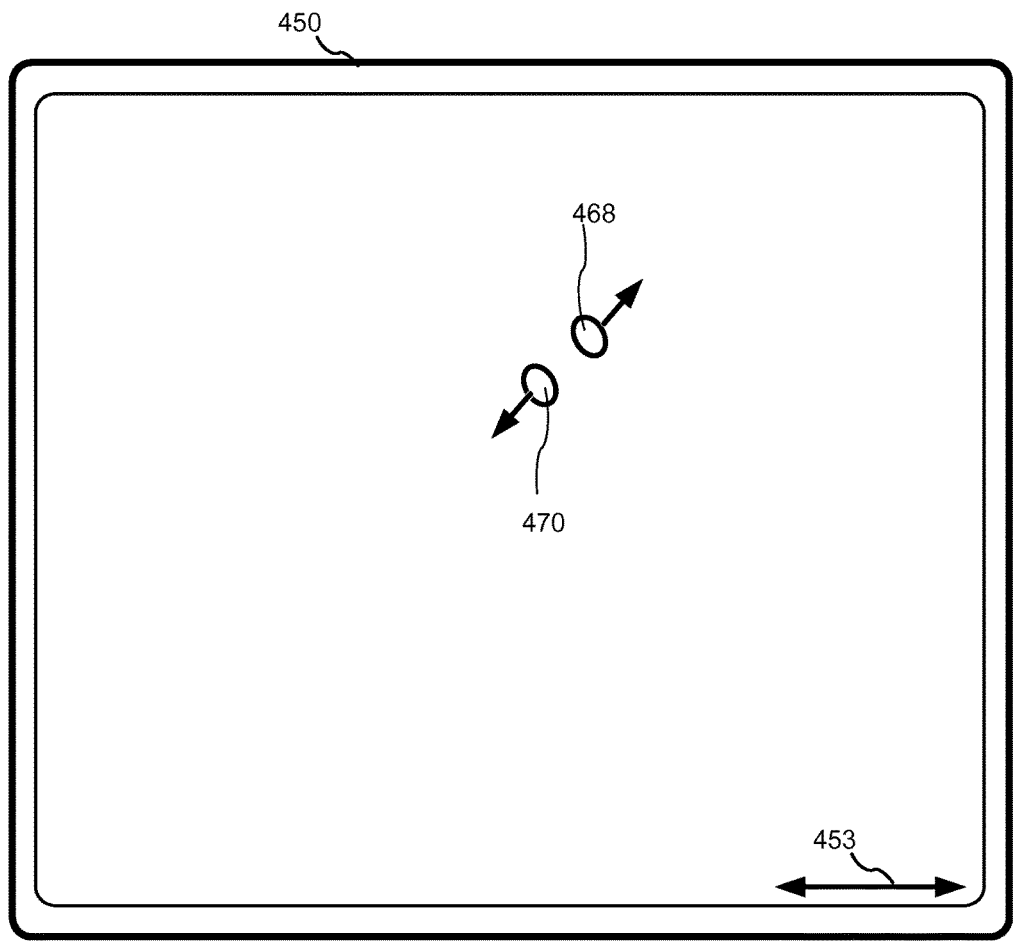
FIG. 4 illustrates an exemplary user interface for a multifunction device with a touch-sensitive surface that is separate from the display in accordance with some embodiments.
Figure 4:
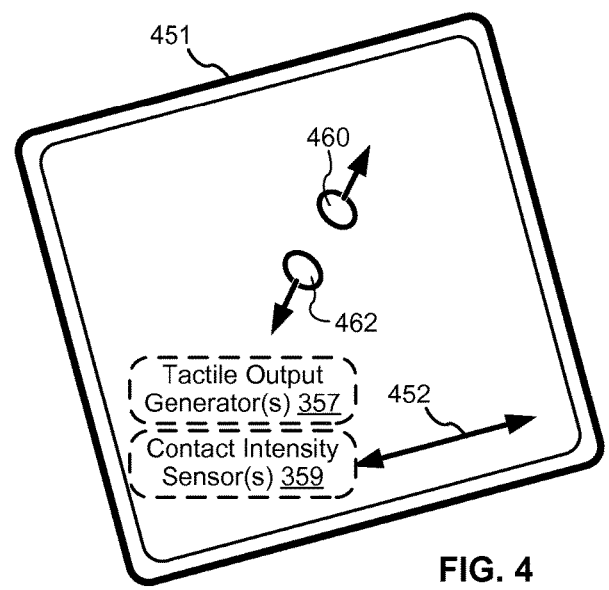

FIG. 4 illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4. In some embodiments the touch sensitive surface (e.g., 451 in FIG. 4) has a primary axis (e.g., 452 in FIG. 4) that corresponds to a primary axis (e.g., 453 in FIG. 4) on the display (e.g., 450). In accordance with these embodiments, the device detects contacts (e.g., 460 and 462 in FIG. 4) with the touch-sensitive surface 451 at locations that correspond to respective locations on the display (e.g., in FIG. 4, 460 corresponds to 468 and 462 corresponds to 470). In this way, user inputs (e.g., contacts 460 and 462, and movements thereof) detected by the device on the touch-sensitive surface (e.g., 451 in FIG. 4) are used by the device to manipulate the user interface on the display (e.g., 450 in FIG. 4) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5:
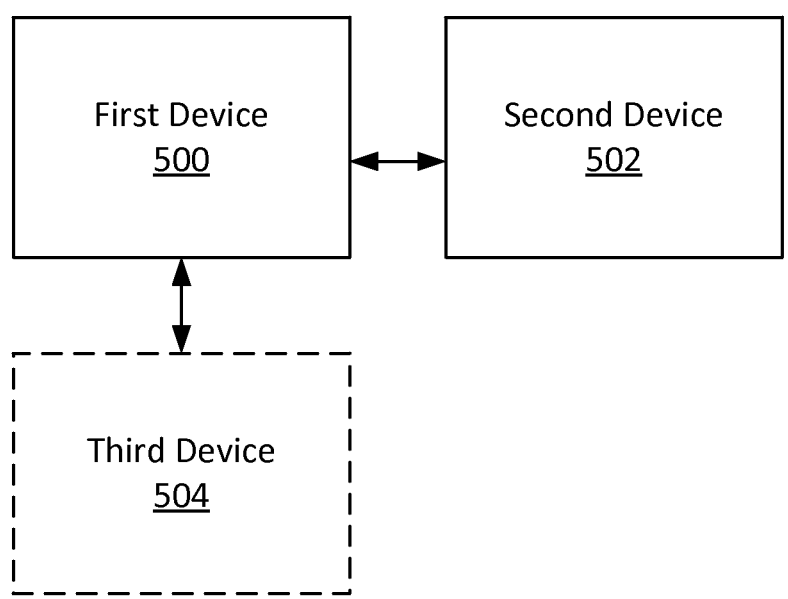
FIG. 5 illustrates a block diagram of exemplary electronic devices in communication in accordance with some embodiments.

FIG. 5 illustrates a block diagram of exemplary electronic devices in communication in accordance with some embodiments. First, second, and third electronic devices 500, 502, and 504 are optionally any electronic device, such as multifunction devices 100 or 300, as illustrated in FIGS. 1A-B, 2, and 3. For example, the first electronic device 500 is optionally a head unit in an automobile audio system, and the second and third electronic devices 502 and 504 are optionally phones, tablets, or laptop computers.

User Interfaces and Associated Processes

A head unit in an automobile audio system provides one or more affordances (e.g., physical buttons or virtual buttons on a touch screen) that are programmable for functionality of the audio system. For example, an affordance can be programmed to bookmark a particular radio station on the head unit by pressing and holding the affordance while the radio is tuned to the particular radio station. Then, by pressing the affordance later, the particular radio station can be automatically recalled. Further, modern head units are capable of utilizing the functionality of portable multifunction devices such as phones and tablets. There is a need to provide a fast, efficient, and intuitive way for users to use affordances of a head unit to bookmark functionality on a connected phone or tablet. The embodiments described below provide an intuitive way for a first electronic device (e.g., a head unit) to request context information from a second electronic device (e.g., a phone or tablet), and to store the context information in association with an affordance (e.g., such as a physical or virtual button on the head unit) so that the context can be later recalled in response to input on the affordance.

Figure 6A:
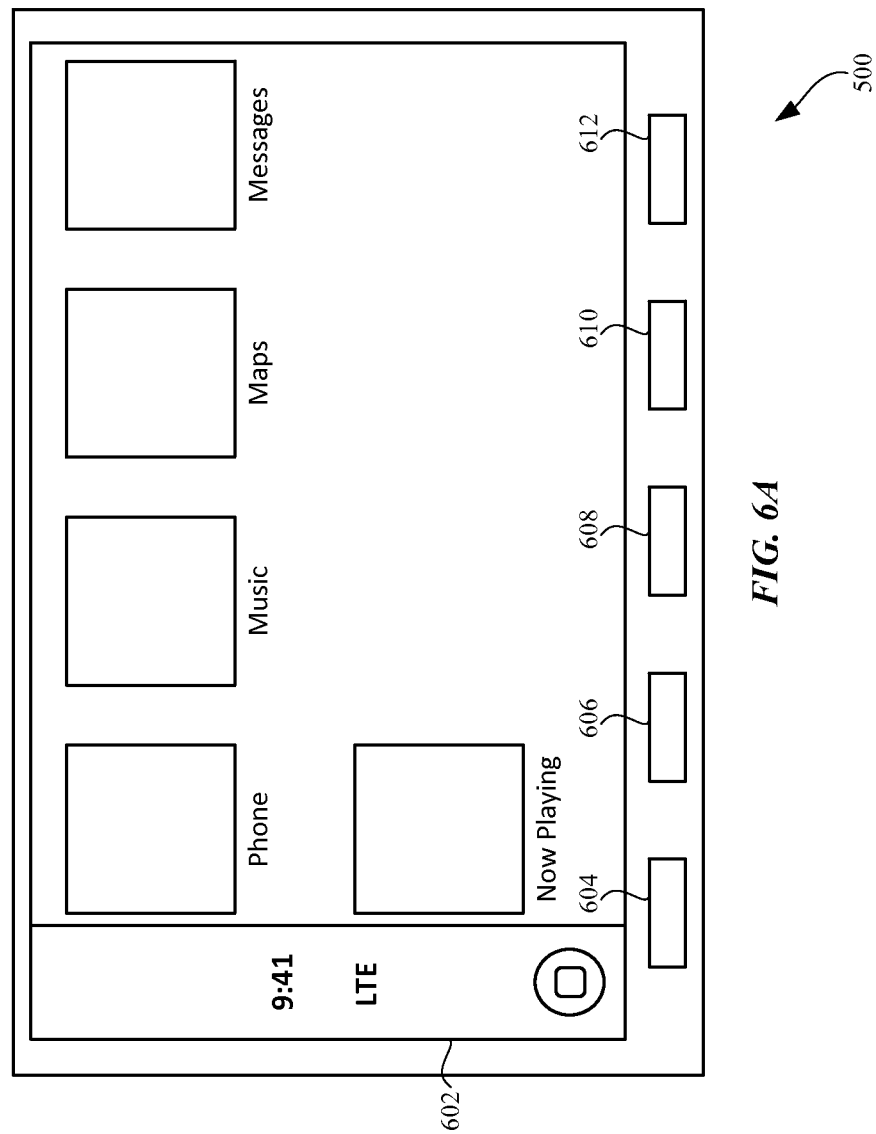
FIGS. 6A-6Y illustrate exemplary user interfaces allowing a user to program affordances on a first electronic device to bookmark functionality of a second electronic device in accordance with some embodiments.
Figure 6B:
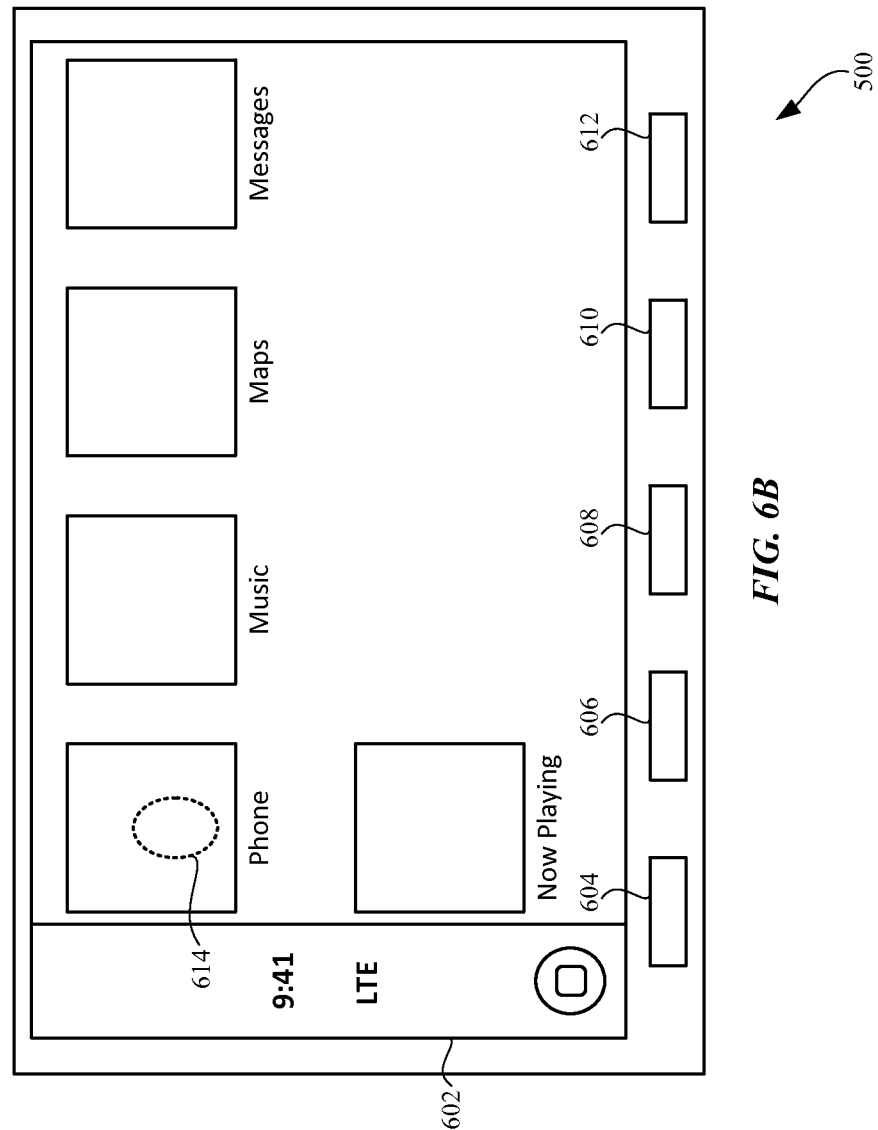
Figure 6C:
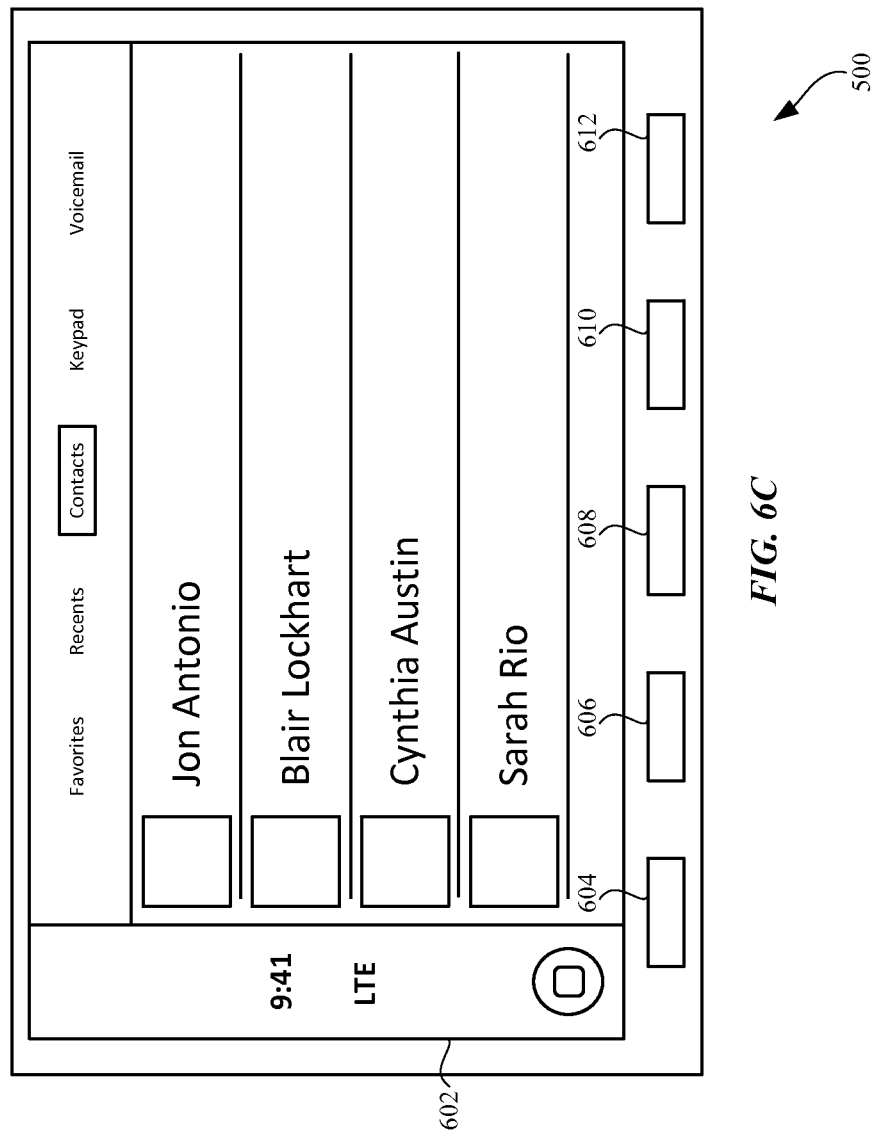
Figure 6D:
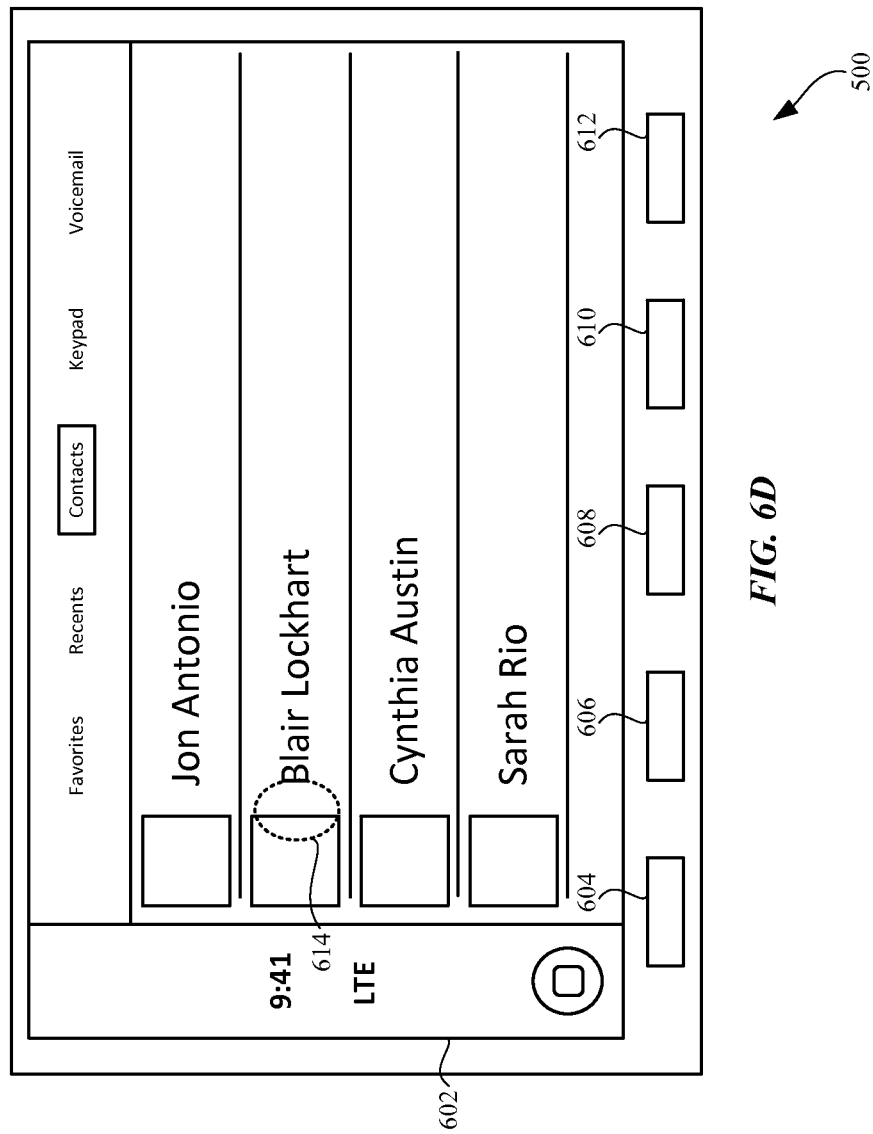
Figure 6E:
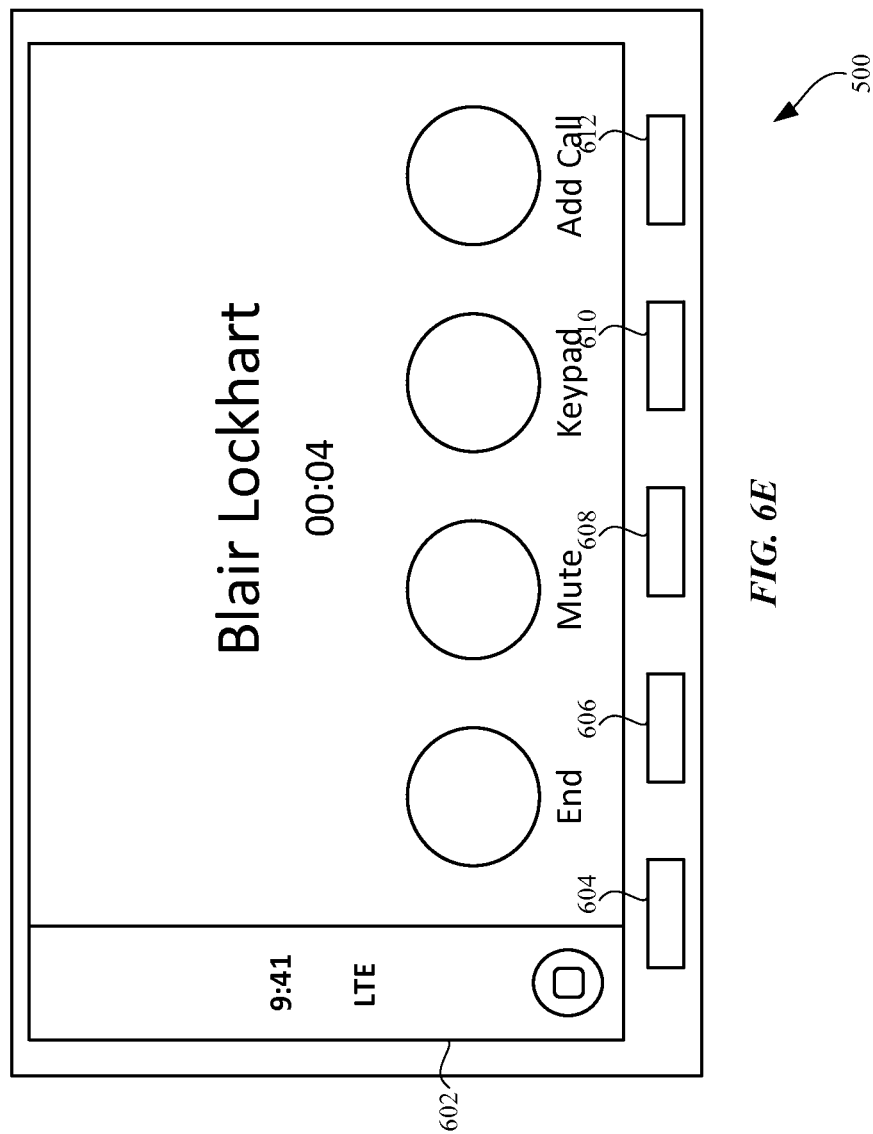
Figure 6F:
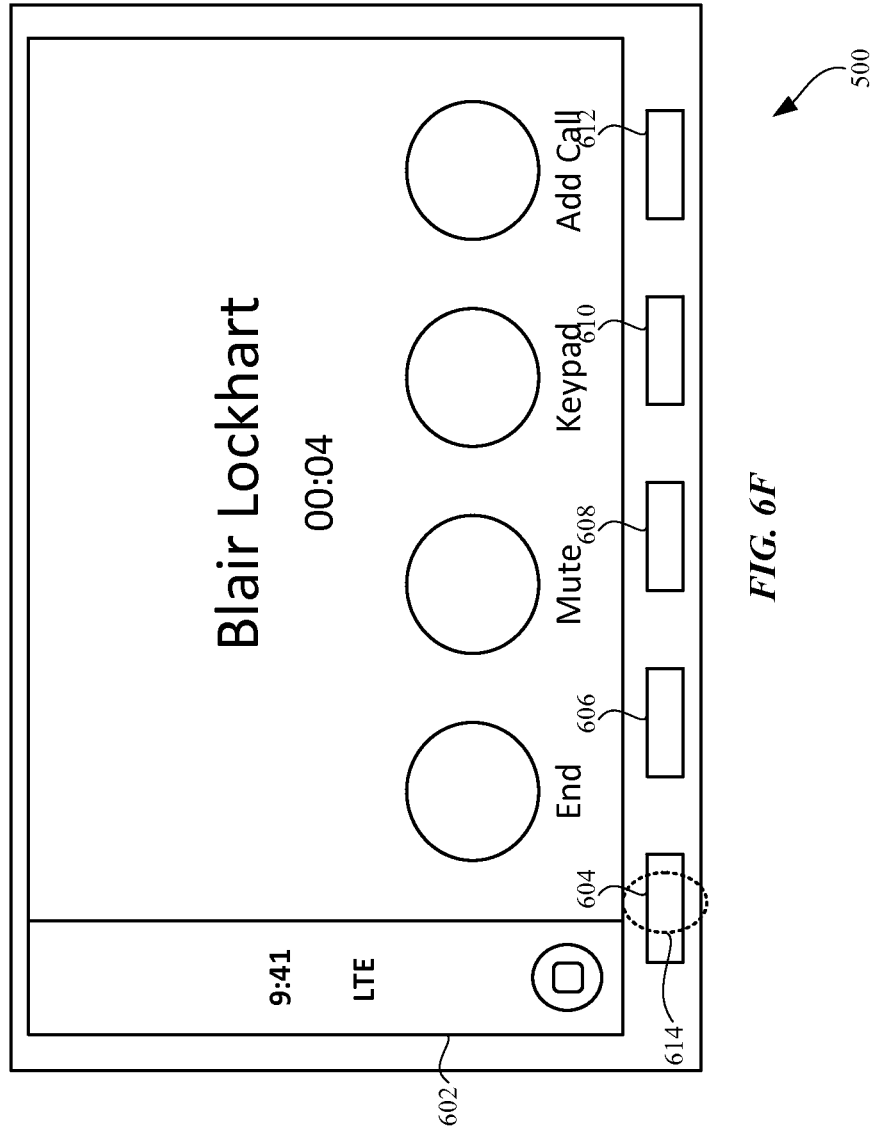
Figure 6H:
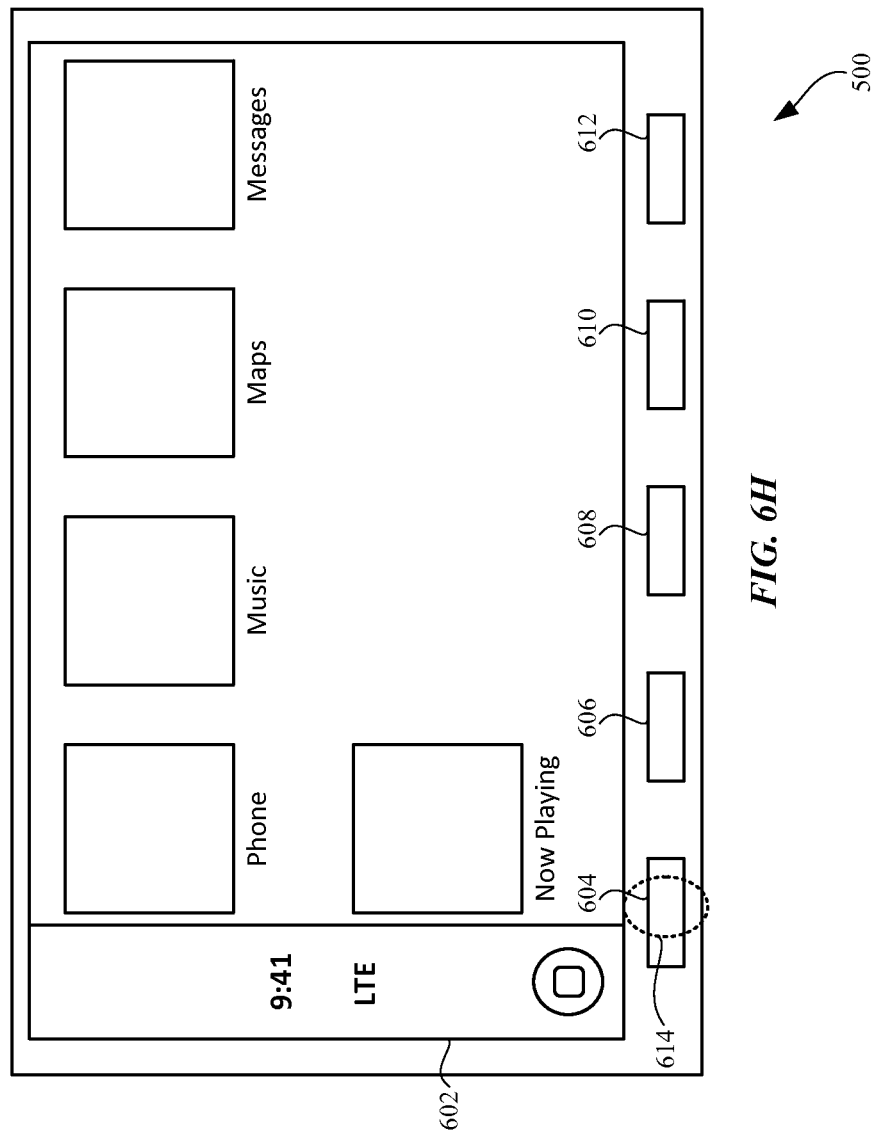
Figure 6I:
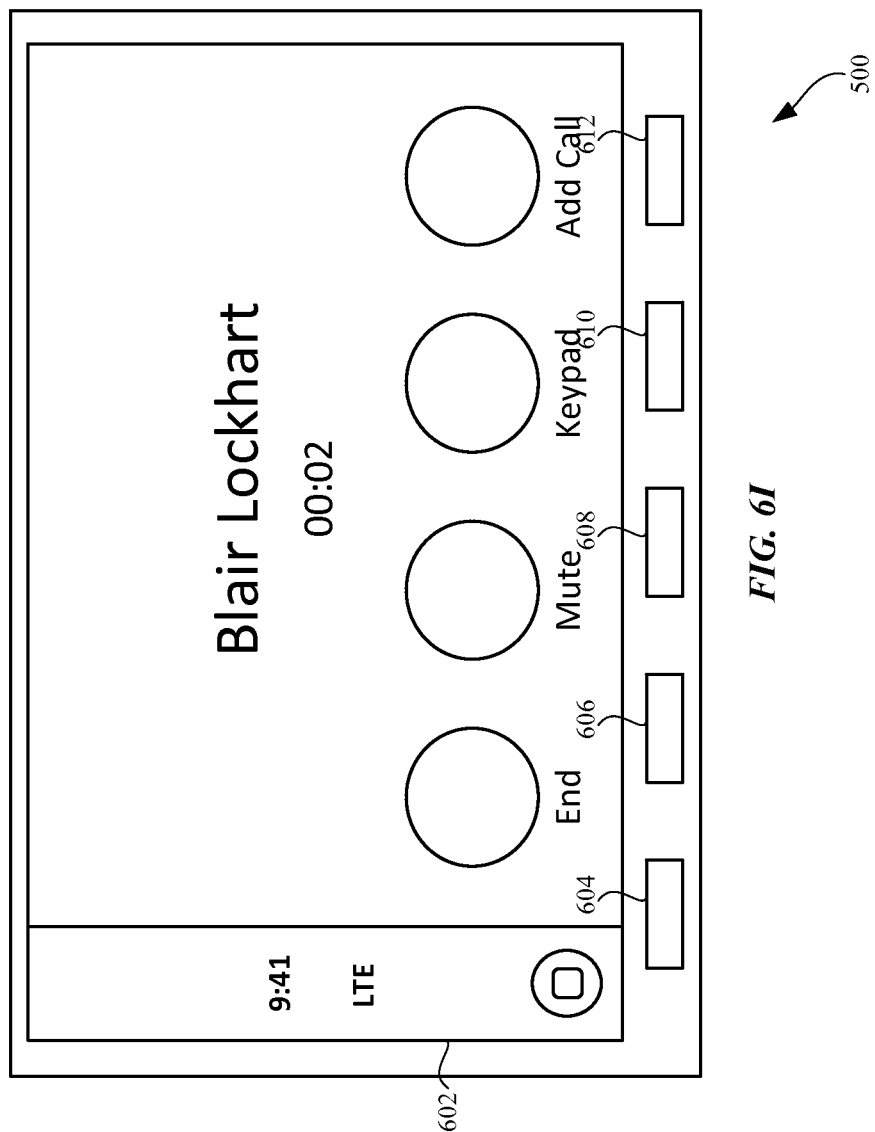
Figure 6J:
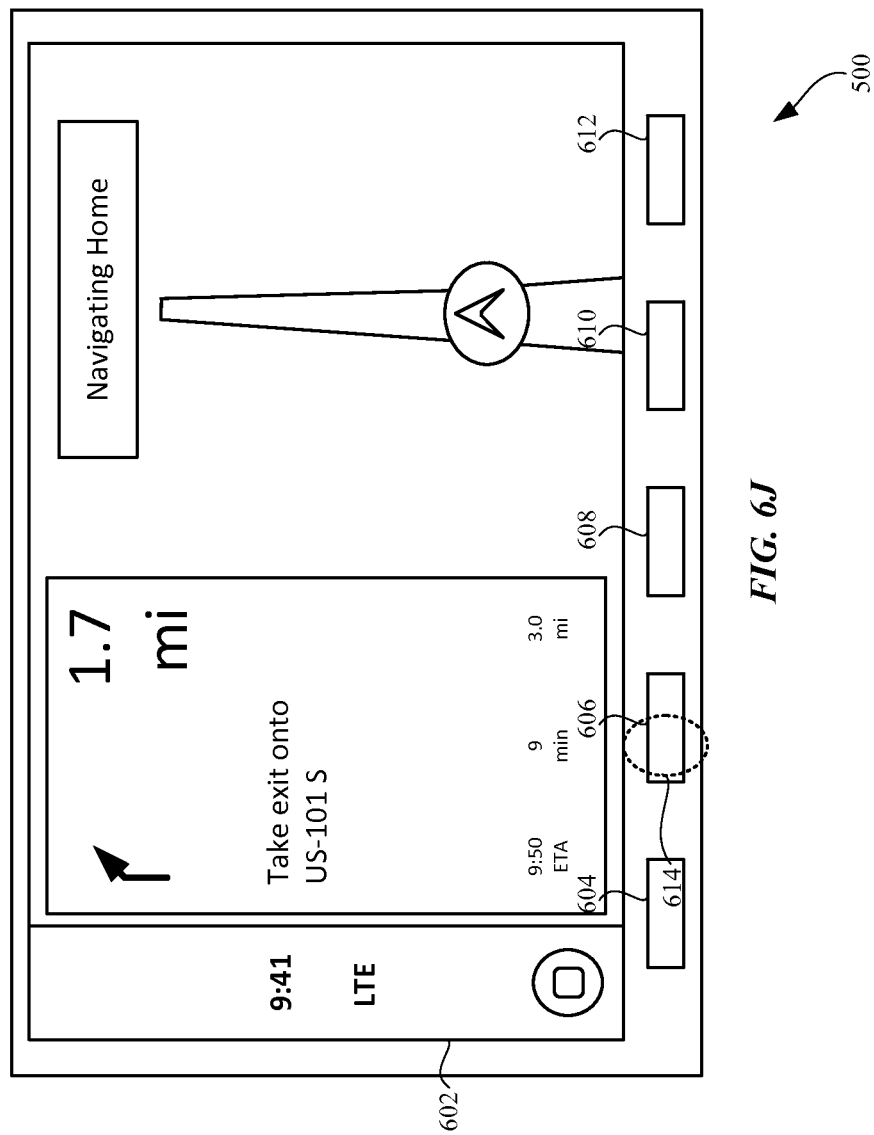
Figure 6K:
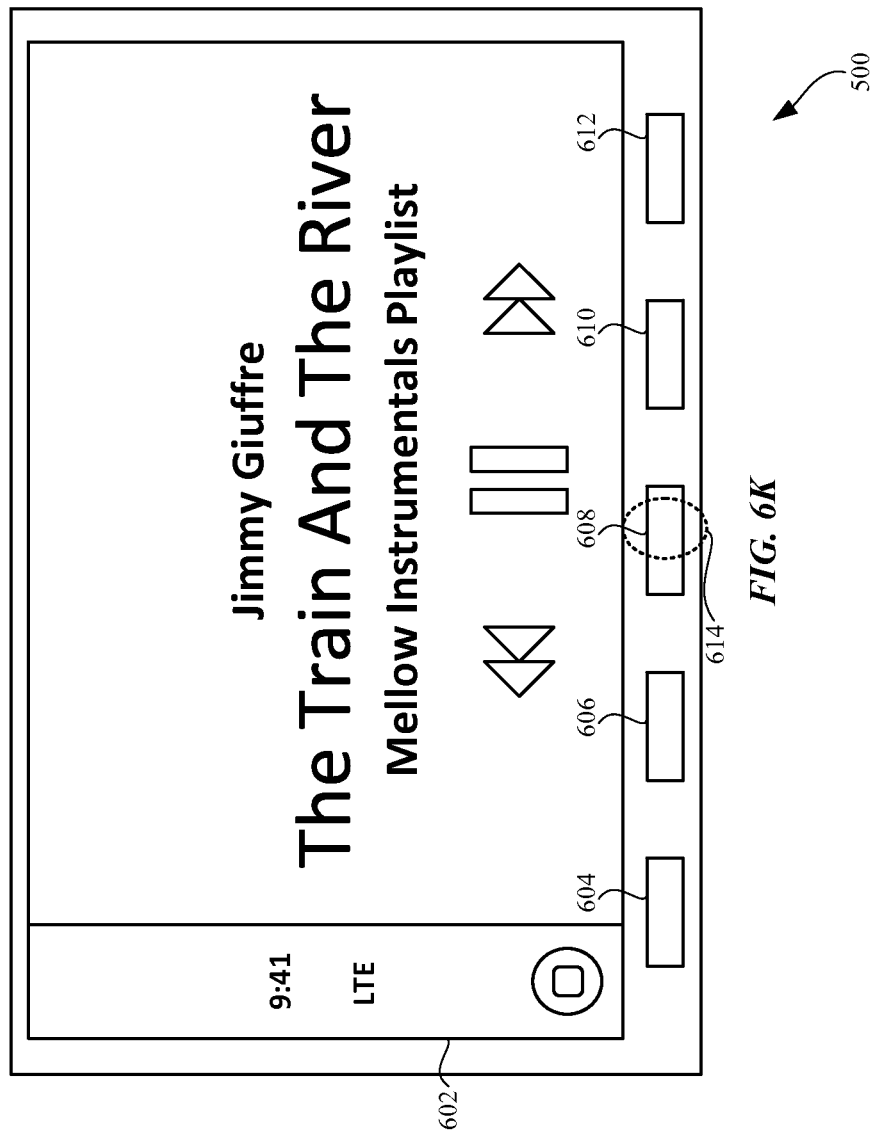
Figure 6L:
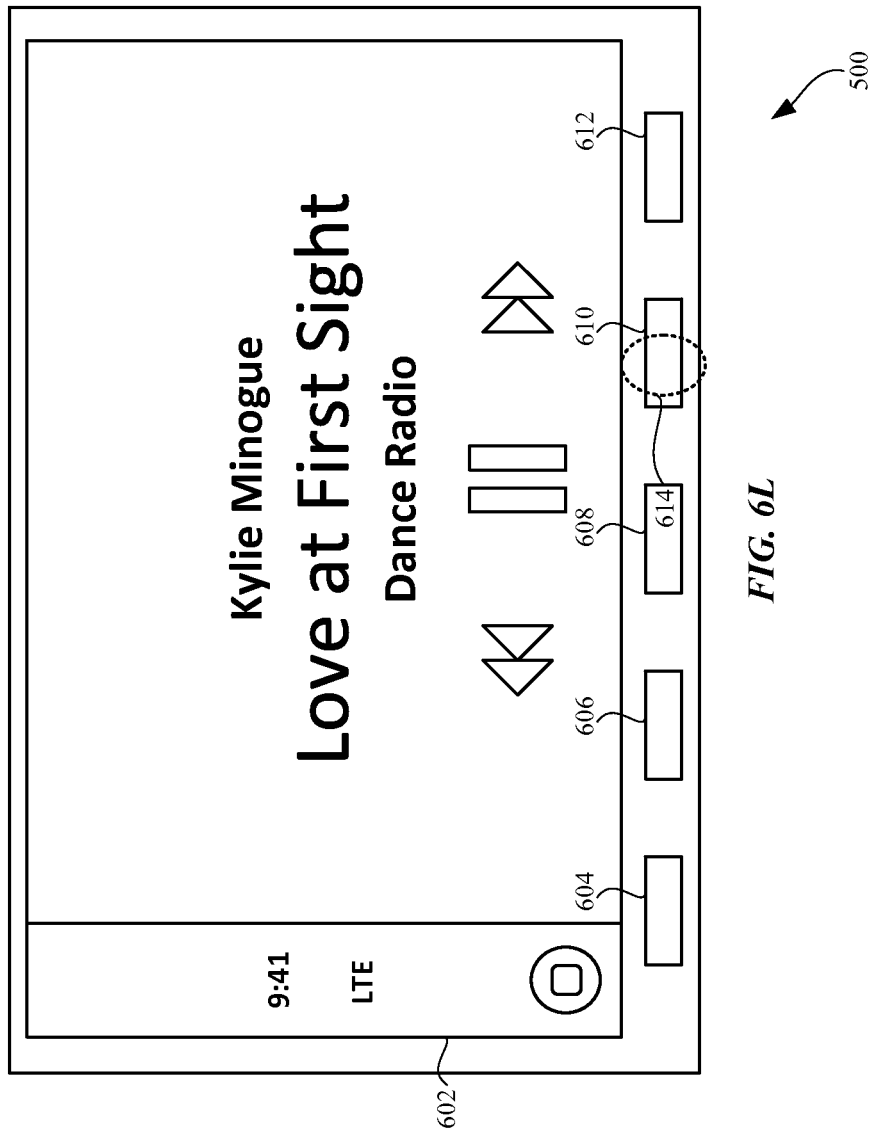
Figure 6M:
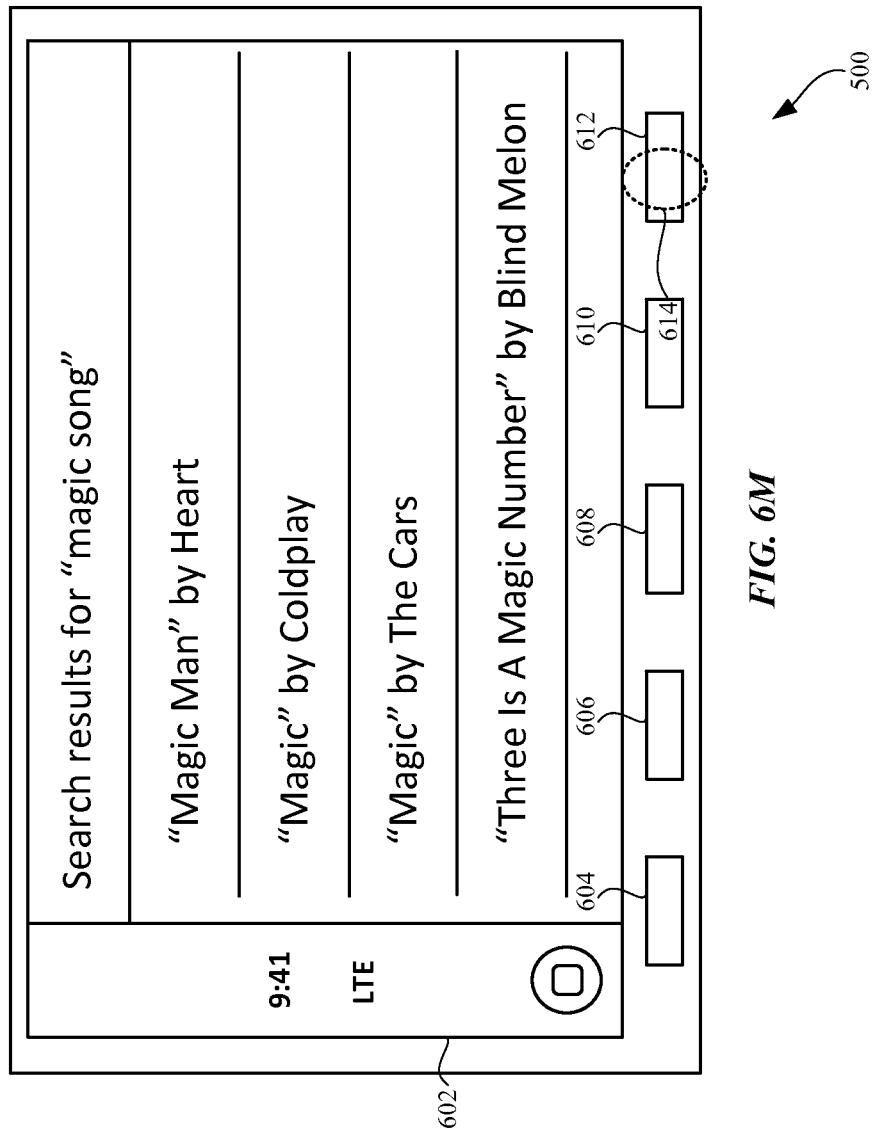
Figure 6O:
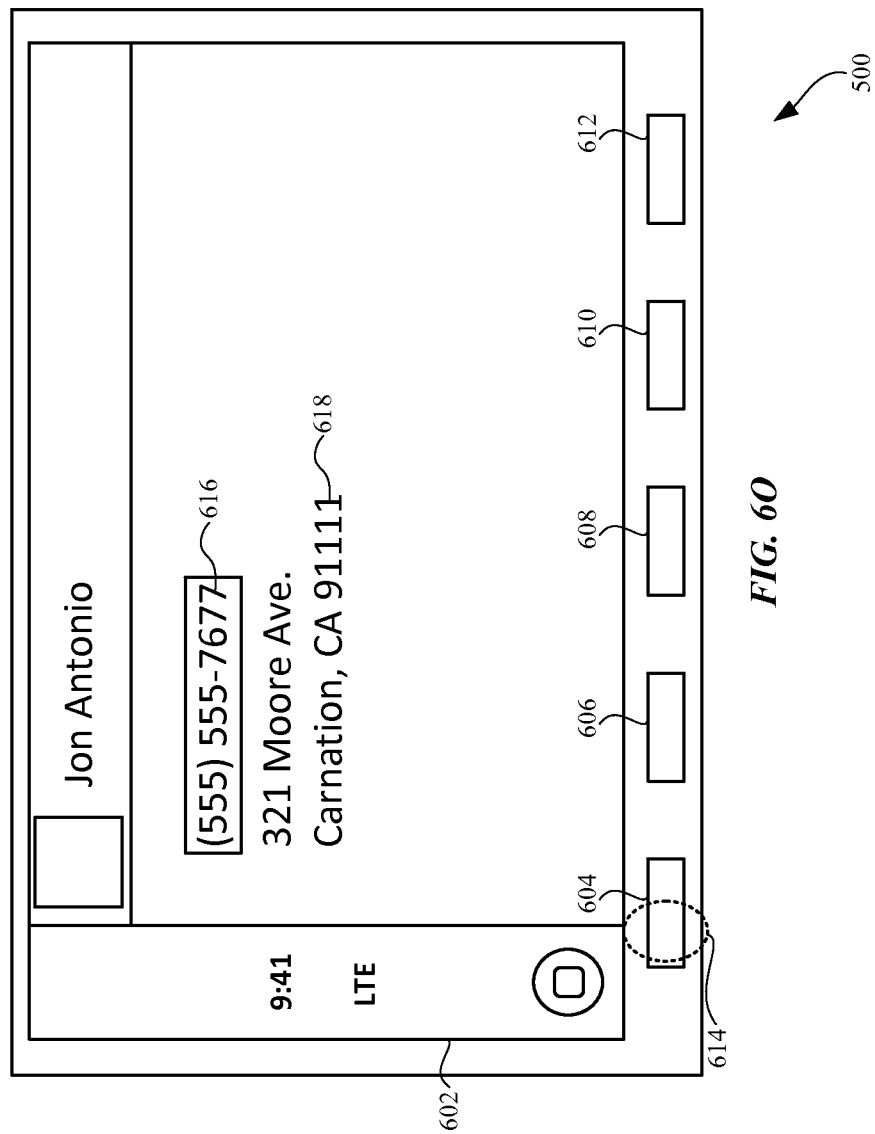
Figure 6P:
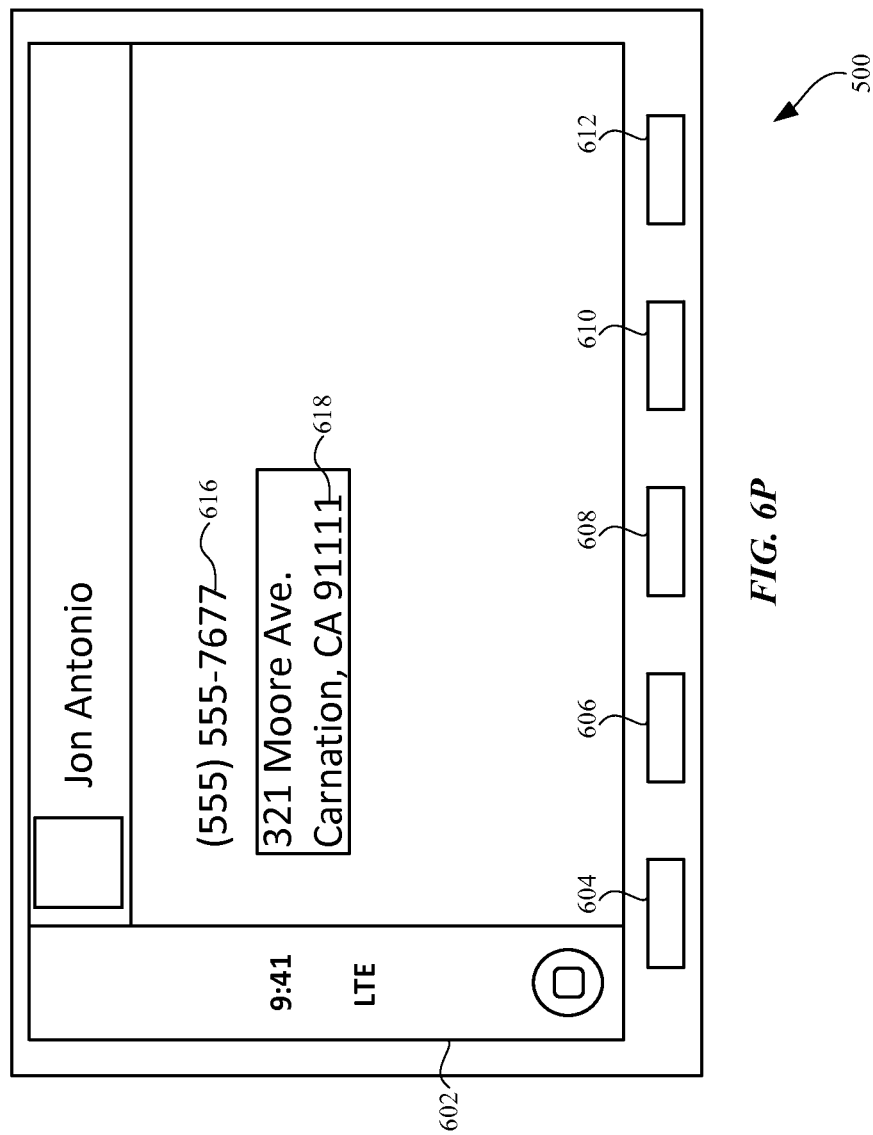
Figure 6R:
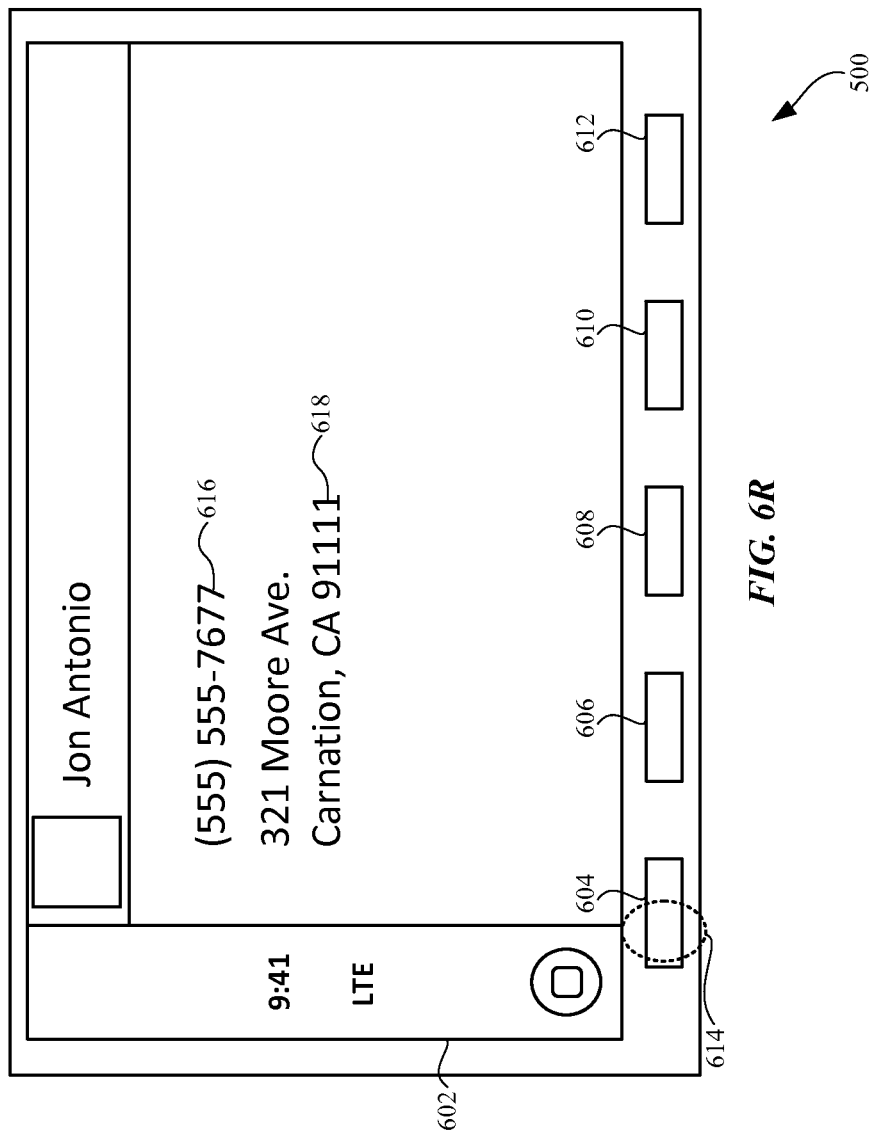
Figure 6S:
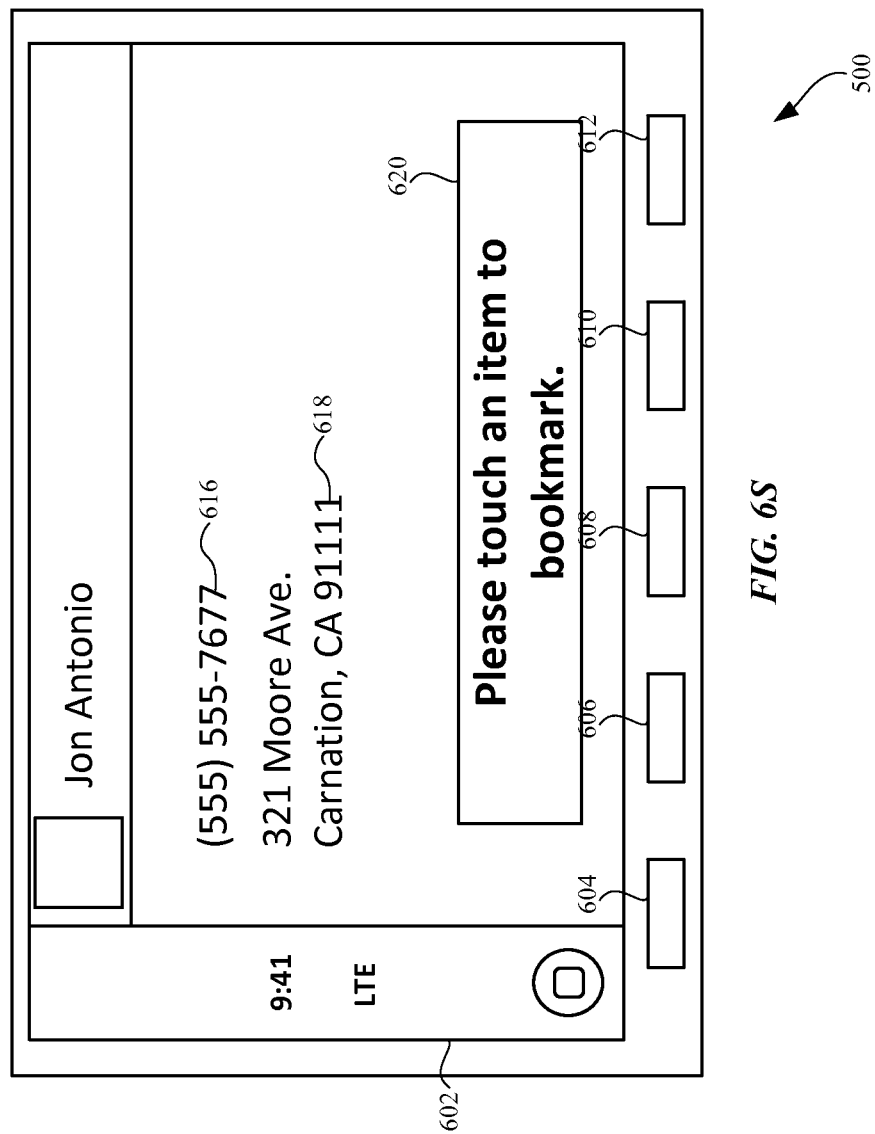
Figure 6Y:
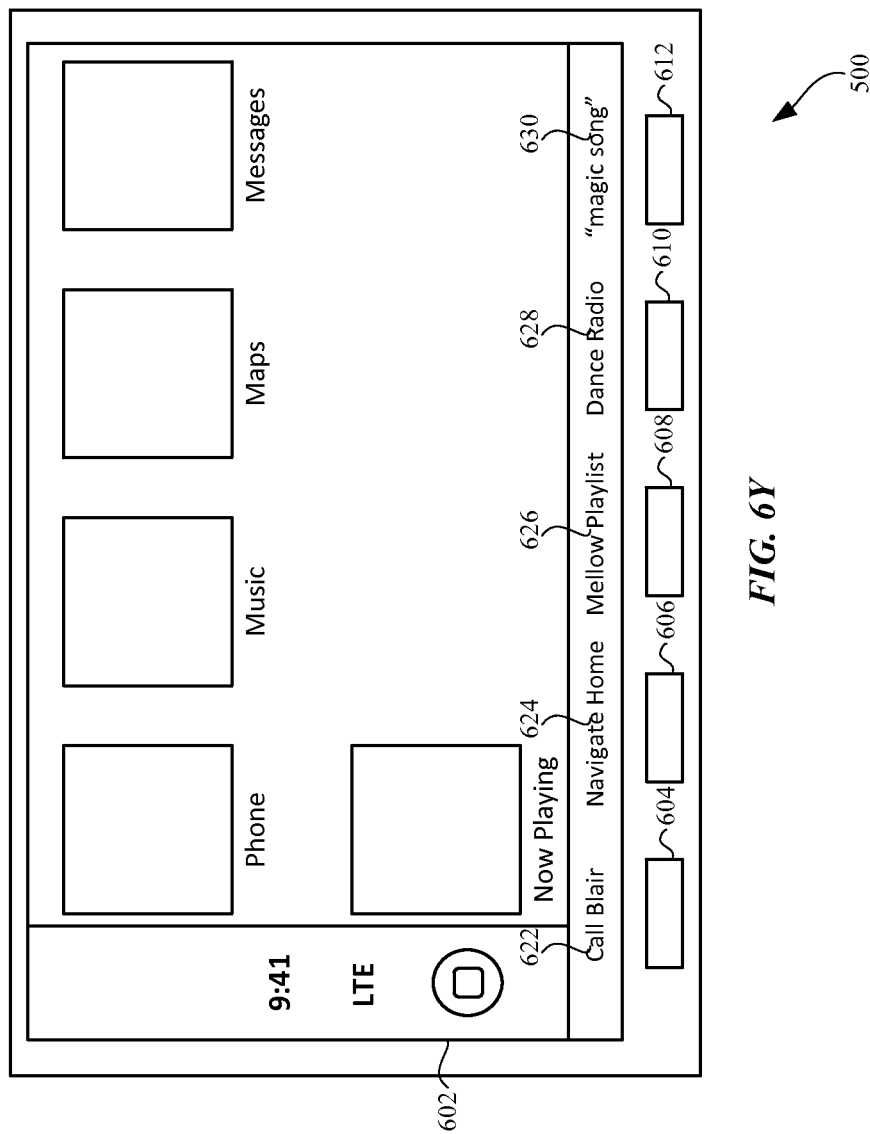
Figure 7A:
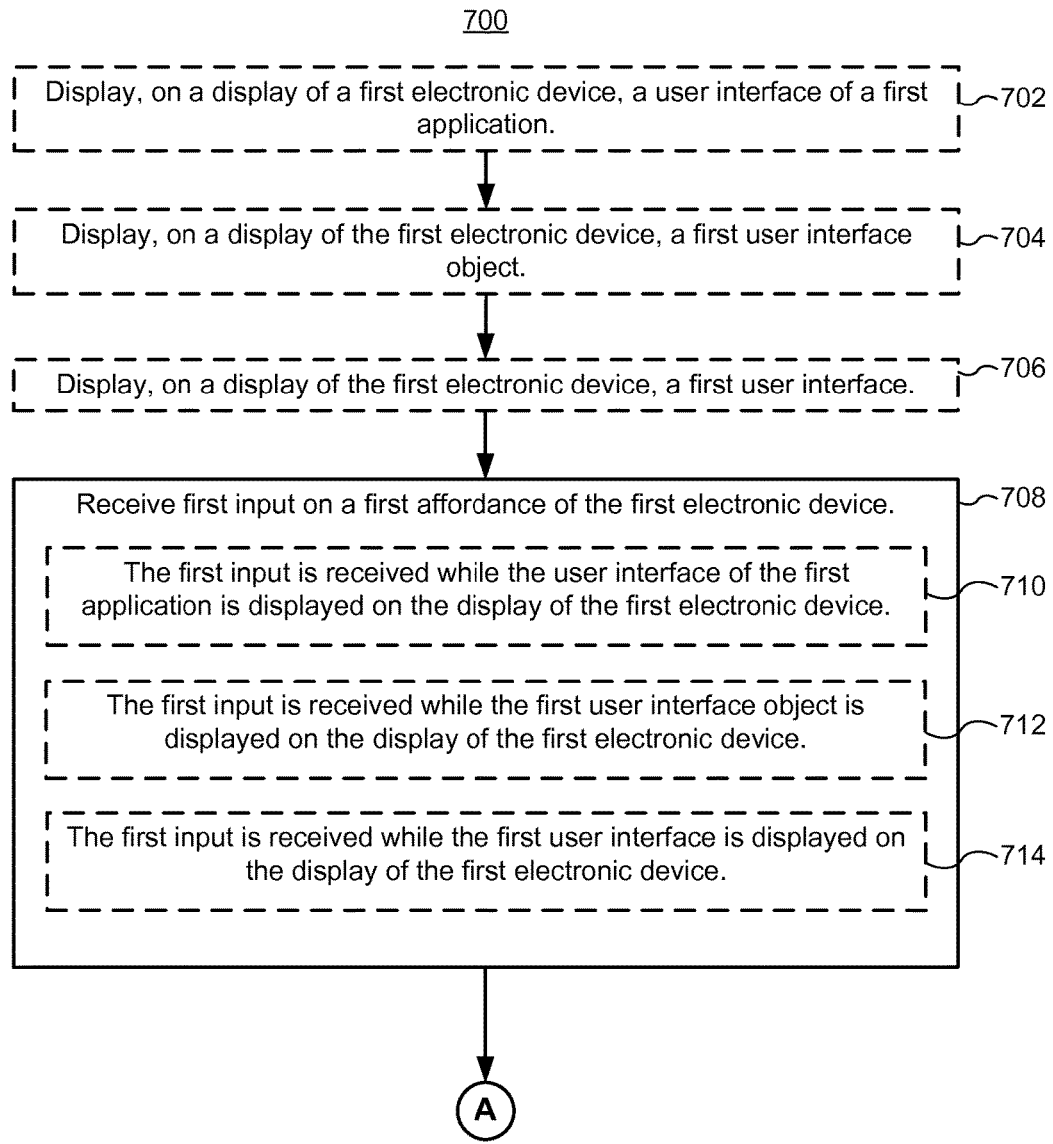
FIGS. 7A-7D are flow diagrams illustrating a method allowing a user to program affordances on a first electronic device to bookmark functionality of a second electronic device in accordance with some embodiments.
Figure 7B:
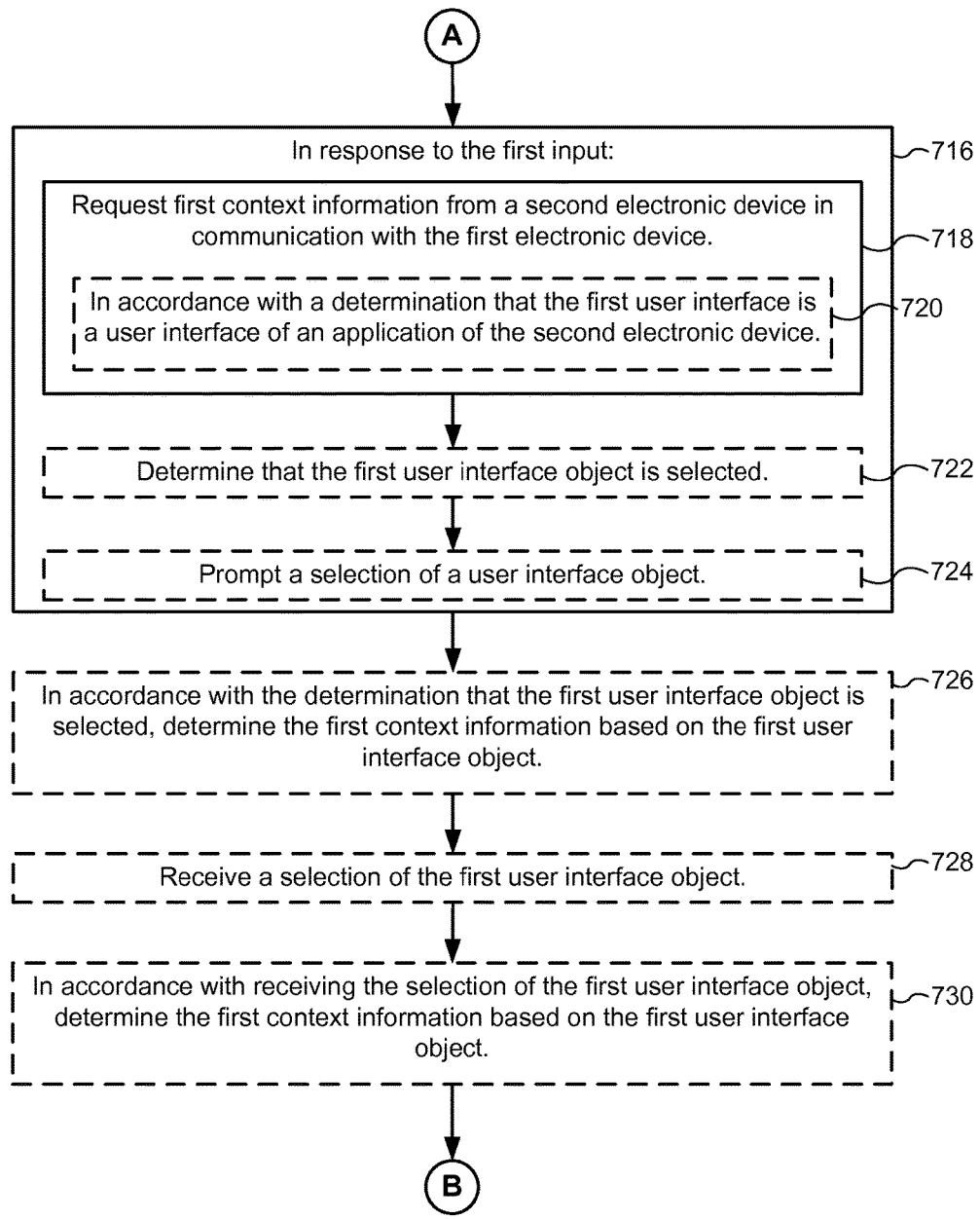
Figure 7C:
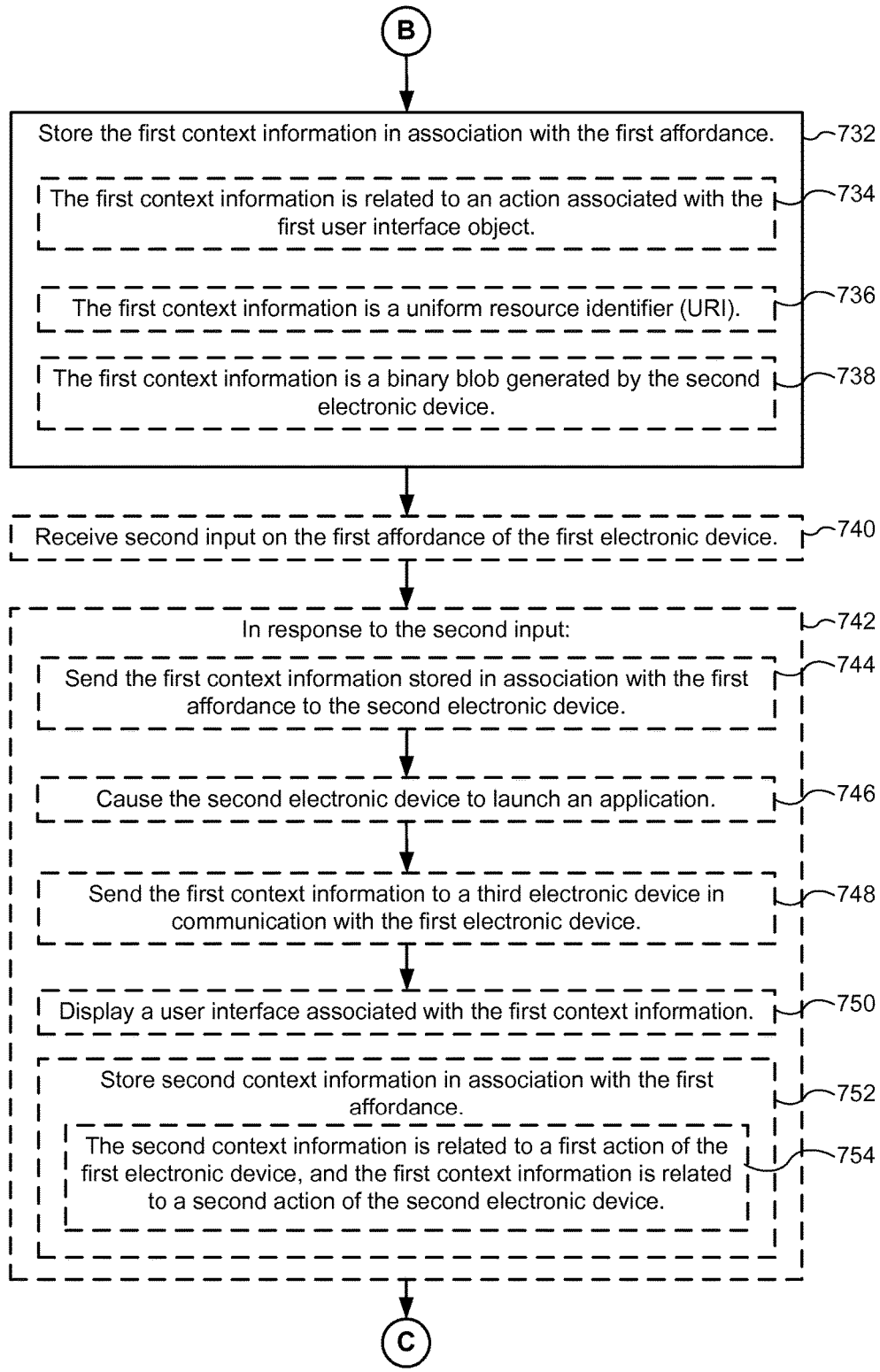
Figure 7D:
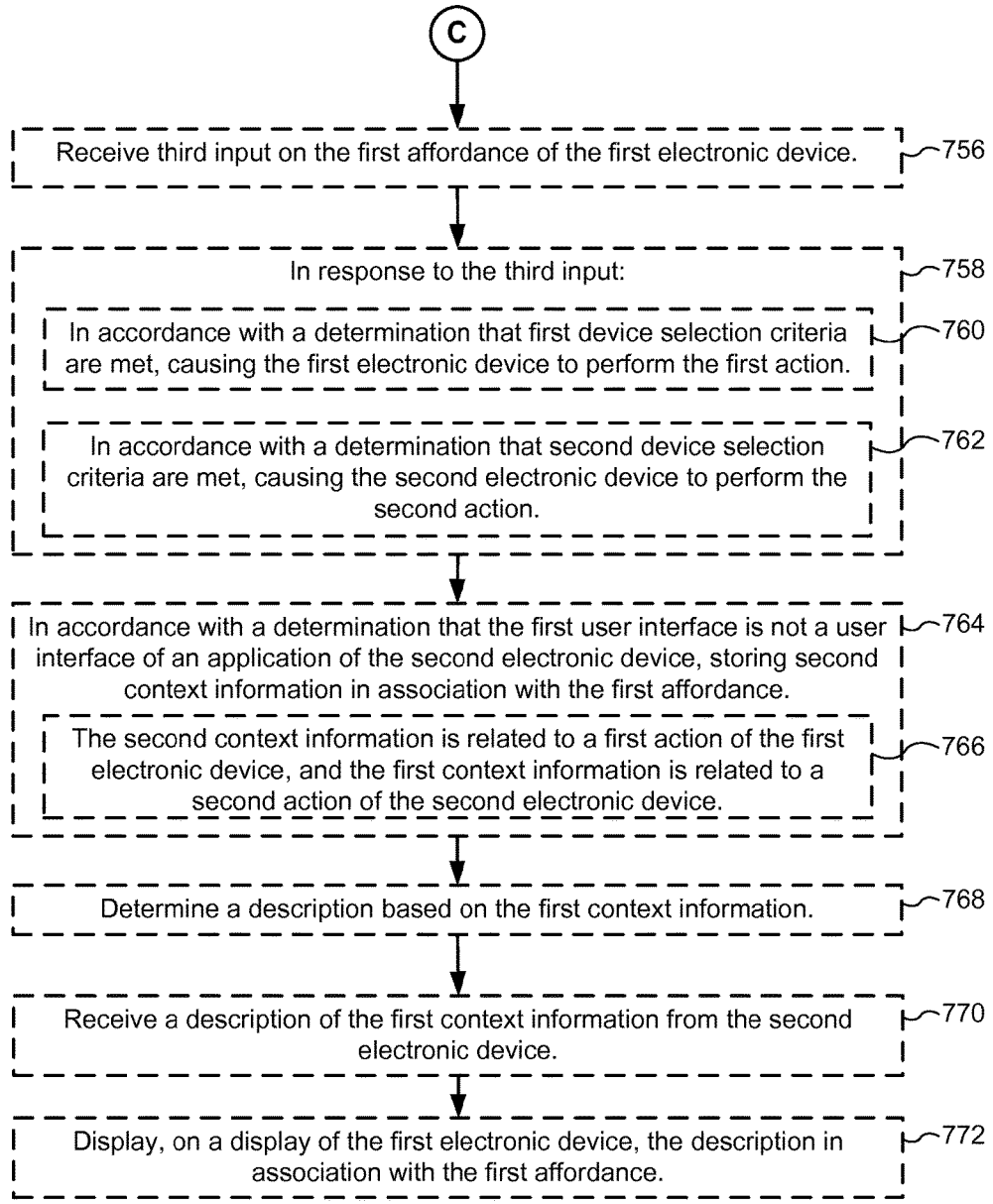

FIGS. 6A-6Y illustrate exemplary user interfaces allowing a user to program affordances on a first electronic device to bookmark functionality of a second electronic device in accordance with some embodiments. The user interfaces in these figures are used to illustrate the processes described below, including the processes described below with reference to FIGS. 7A-7D.

FIGS. 6A-6I illustrate an exemplary user interaction with a user-programmable button in accordance with some embodiments. FIG. 6A illustrates a first electronic device 500 including a user interface 602 and affordances 604, 606, 608, 610, and 612. The user interface 602 is optionally a user interface provided by one or more applications on a second electronic device (e.g., the second electronic device 502 illustrated in FIG. 5). FIG. 6A illustrates an application menu interface for selecting applications available on the second electronic device. FIG. 6B illustrates input 614 (e.g., a touch input, pressing of a physical button, etc.) on an icon of a phone application in the user interface 602, which causes a phone application to be launched on the second electronic device. As illustrated in FIG. 6C, a user interface of the phone application is then displayed on the first electronic device 500. In FIG. 6D, input 614 is received on the contact name "Blair Lockhart," initiating a phone call with the contact "Blair Lockhart." A phone call interface is illustrated in FIG. 6E.

During the phone call with Blair Lockhart, a user can press and hold one of the affordances 604, 606, 608, 610, or 612 to program that affordance to call Blair Lockhart when it is pressed again. FIG. 6F illustrates input 614 (e.g., a press and hold input) on the first affordance 604 while the phone call interface is displayed. Each affordance optionally accepts at least two types of input: a first type of input (e.g., a press and hold input) that bookmarks functionality in association with the affordance, and a second type of input (e.g., a tap input) that recalls the functionality associated with the affordance. In response to the input on the first affordance, the first electronic device 500 requests context information from the second electronic device, and the second electronic device sends context information (e.g., a uniform resource identifier (URI) link to call Blair Lockhart) back to the first electronic device. The first electronic device 500 then stores the context information in association with the first affordance 604.

FIG. 6G illustrates an application menu interface, and FIG. 6H illustrates input 614 received on the first affordance 604 (e.g., a second type of input, such as a tap input, different from the first type of input) while the application menu interface is displayed. In response, the first electronic device 500 sends the context information stored in association with the first affordance 604 to the second electronic device. The second electronic device uses the context information to invoke the phone application to call Blair Lockhart (e.g., if the context information is a URI link to call Blair Lockhart, then the second electronic device executes the link received from the first electronic device). A user interface associated with the context information is then displayed on the first electronic device 500 (e.g., a phone call interface, as illustrated in FIG. 6I).

In some embodiments, the context information sent from the second electronic device to the first electronic device is optionally based on an open application on the second electronic device and/or the user interface of the open application as displayed on the first electronic device, as illustrated in FIGS. 6J-6M. Although many of the embodiments discussed herein include a phone application, embodiments are not so limited and can be further applied to other applications.

For example, FIG. 6J illustrates input 614 (e.g., a first type of input, such as a press and hold input) on the second affordance 606 while a navigation application is navigating to "Home," thereby bookmarking the action of navigating to "Home" in association with the second affordance. FIG. 6K illustrates input 614 (e.g., a first type of input, such as a press and hold input) on the third affordance 608 while a music application is playing the "Mellow Instrumentals" playlist, thereby bookmarking the action of playing the "Mellow Instrumentals" playlist in association with the third affordance. FIG. 6L illustrates input 614 (e.g., a first type of input, such as a press and hold input) on the fourth affordance 610 while a music application is playing the "Dance Radio" radio station, thereby bookmarking the action of playing the "Dance Radio" radio station in association with the fourth affordance. FIG. 6M illustrates input 614 (e.g., a first type of input, such as a press and hold input) on the fifth affordance 612 while a search application is displaying search results for a "magic song" search, thereby bookmarking the action of searching for "magic song" in association with the fifth affordance.

In some embodiments, the context information sent from the second electronic device to the first electronic device is optionally associated with a user interface object displayed on the first electronic device, as illustrated in FIGS. 6N-6T. FIG. 6N illustrates a contact page interface and FIG. 6O illustrates input 614 (e.g., a first type of input, such as a press and hold input) on the first affordance 604 while a phone number 616 is selected, thereby bookmarking the action of calling the phone number in association with the first affordance. FIG. 6P illustrates a contact page interface and FIG. 6Q illustrates input 614 (e.g., a first type of input, such as a press and hold input) on the first affordance 604 while an address 618 is selected, thereby bookmarking the action of navigating to the address in association with the first affordance.

In some embodiments, input on an affordance optionally causes a prompt to select a user interface object to bookmark in association with the affordance. For example, 6R illustrates input 614 (e.g., a first type of input, such as a press and hold input) on the first affordance 604 while user interface objects 616 and 618 are displayed but neither is selected. In response to the input, a prompt 620 is displayed requesting that an item be selected, as illustrated in FIG. 6S. FIG. 6T illustrates input 614 (e.g., such as a tap input) selecting the address 618, thereby bookmarking the action of navigating to the address in the first affordance.

In some embodiments, the context information sent from the second electronic device to the first electronic device is optionally associated with a user interface that is no longer displayed. For example, FIG. 6U illustrates ending a phone call with "Blair Lockhart" in response to input 614 on an "End" user interface object. The phone call interface is no longer displayed in FIG. 6V, and input 614 (e.g., a first type of input, such as a press and hold input) is received on the first affordance 604 in FIG. 6W. In response to the input 614 on the first affordance 604, the most recent action (e.g., the phone call with "Blair Lockhart") is optionally bookmarked in association with the first affordance, even though the phone call interface is no longer displayed when the input on the first affordance is received.

In some embodiments, an affordance that is programmed to bookmark functionality of the second electronic device can be reprogrammed to bookmark functionality of the first electronic device. For example, the first affordance 604 is optionally associated with context information for functionality on the second electronic device (e.g., a bookmark to call "Blair Lockhart" on the second electronic device). FIG. 6X illustrates a user interface 602 (e.g., a radio station user interface) of the first electronic device with input 614 (e.g., a first type of input, such as a press and hold input) being received on the first affordance 604, thereby causing the first affordance to be reprogrammed to replace the bookmark for functionality on the second device (calling "Blair Lockhart") with a bookmark for functionality on the first electronic device (tuning to the radio station 103.7).

In some embodiments, a description of the context information is optionally displayed in association with a corresponding affordance. For example, FIG. 6Y illustrates a description "Call Blair" 622 in association with the first affordance 604, a description "Navigate Home" 624 in association with the second affordance 606, a description "Mellow Playlist" 626 in association with the third affordance 608, a description "Dance Radio" 628 in association with the fourth affordance 610, and a description "magic song" 630 in association with the fifth affordance 612. In some embodiments, the set of bookmarks associated with the affordances can change based on an application user interface currently displayed, and the displayed descriptions can be changed accordingly. For example, if a phone user interface is displayed, the affordances are optionally associated with a set of phone number bookmarks, whereas if a navigation user interface is displayed, the affordances are optionally associated with a set of destination bookmarks. Although FIG. 6Y illustrates textual descriptions without graphics, in some embodiments the descriptions optionally include graphics and text or graphics without text.

FIGS. 7A-7D are flow diagrams illustrating a method of a user-programmable button in accordance with some embodiments. The method is optionally performed at an electronic device as described above with reference to FIGS. 1A-B and 2-5 (e.g., electronic device 100, 300, 500, 502 or 504, etc.). Optional or alternative operations in FIGS. 7A-7D are indicated in dashed boxes. Some operations in method 700 are, optionally, combined and/or the order of some operations is, optionally, changed.

As described below, the method 700 provides ways of allowing a user to program affordances on a first electronic device to bookmark functionality of a second electronic device. The method reduces the cognitive burden on a user when interacting with a user interface on the device by providing an intuitive way to control the second electronic device using the first electronic device, thereby creating a more efficient human-machine interface. For battery-operated electronic devices, increasing the efficiency of the user's interaction with the user interfaces conserves power and increases the time between battery charges.

In some embodiments, a first electronic device 500 (e.g., a head unit of a car stereo) with one or more processors and memory receives (708) first input (e.g., a press longer than a first time threshold, such as input 614 in FIGS. 6F, 6J-6M, 6O, 6Q, 6R, and 6W) on a first affordance (e.g., a physical button of the first electronic device such as affordances 604, 606, 608, 610, and 612 in FIGS. 6A-6Y, or a button displayed on a touchscreen of the first electronic device, etc.) of the first electronic device.

In response to the first input (716), the first electronic device requests (718) first context information (e.g., a uniform resource identifier (URI) associated with the context of the second electronic device, a URI associated with a contextual action of the second electronic device, etc.) from a second electronic device 502 (e.g., a portable multifunction device) in communication with the first electronic device (e.g., through a communication protocol such as Bluetooth).

The first electronic device 500 stores (732) the first context information in association with the first affordance. In some embodiments, the first context information is (736) optionally a uniform resource identifier (URI) (e.g., a URI that can be used by any device on a specific platform, such as Apple iOS). In some embodiments, the first context information is (738) optionally a binary blob generated by the second electronic device 502 (e.g., a cryptographically signed blob that can only be decrypted by the second electronic device, or another device having the same encryption key as the second electronic device). In some embodiments, the first context information is optionally stored on the second electronic device instead of or in addition to being stored on the first electronic device. In such a case, the context information is optionally stored in association with information identifying the first electronic device, and the second electronic device optionally stores other context information in association with information identifying other electronic devices. For example, in a first car with a first electronic device, the second electronic device can identify the first electronic device and perform a first operation (e.g., navigate home) in response to input on a first affordance of the first electronic device, and in a different car with a different electronic device, the second electronic device can identify the different electronic device and perform a second operation different from the first operation (e.g., call Blair) in response to input on a first affordance of the different electronic device. In this way, one electronic device can store different bookmark sets for different head units in different cars.

In some embodiments, context information is optionally requested prior to receiving input on an affordance to associate with the context information. For example, a user can request a bookmark by performing a touch and hold gesture on a user interface object to bookmark. In response, context information associated with the user interface object is requested from the second electronic device, and the user is prompted to select an affordance to associate with the context information. After the user selects an affordance, the context information is stored in association with the selected affordance.

In some embodiments, the first electronic device 500 receives (740) second input (e.g., a press shorter than a first time threshold) on the first affordance of the first electronic device (e.g., input 614 in FIG. 6H). In response to the second input (742), the first electronic device 500 sends (744) the first context information stored in association with the first affordance to the second electronic device 502, and the first electronic device displays (750) a user interface associated with the first context information, as illustrated in FIG. 6I.

In some embodiments, the first electronic device 500 displays (702), on a display of the first electronic device, a user interface of a first application (e.g., the user interface of the phone application, the navigation application, the music application, or the search application, as illustrated in FIGS. 6F and 6J-6M), wherein the first input is received while the user interface of the first application is displayed on the display of the first electronic device (710). Further in response to the second input (742), the first electronic device 500 causes (746) the second electronic device 502 to launch an application (e.g., the first application or a second application, different from the first application).

In some embodiments, the first electronic device is in communication with a third electronic device 504, different from the second electronic device. In response to the second input (742), the first electronic device 500 sends (748) the first context information stored in association with the first affordance to the third electronic device, and the first electronic device displays (750) a user interface associated with the first context information (e.g., a user interface provided by the third electronic device 504). For example, if the second electronic device is no longer connected to the first electronic device, the context information is optionally sent to another connected device, such as the third electronic device, to carry out the desired functionality.

In some embodiments, the first electronic device displays (704), on a display of the first electronic device, a first user interface object (e.g., user interface objects 616 and 618 in FIGS. 6N-6T), and the first input is received while the first user interface object is displayed on the display of the first electronic device (712). In such a case, the first context information is optionally related (734) to an action associated with the first user interface object (e.g., the first context information is a URI to invoke an action associated with the first user interface object). For example, the first user interface object optionally includes contact information and the context information is a URI to call the contact, the first user interface object optionally includes a location and the context information is a URI to navigate to the location, the first user interface object optionally includes a playlist and the context information is a URI to play the playlist, or the first user interface object optionally includes a search term and the context information is a URI to perform a search using the search term.

In some embodiments, the context information is related to an action associated with a user interface that is no longer displayed when the first input is received. For example, if the first input is received after hanging up a phone call with a contact (e.g., the phone call interface is no longer displayed), then the context information is optionally a URI to call back the contact, as discussed above with respect to FIGS. 6U-6W.

In some embodiments, the first electronic device 500 determines (722) that the first user interface object is selected, and, in accordance with the determination that the first user interface object is selected, determines (726) the first context information based on the first user interface object, as discussed above with respect to FIGS. 6N-6Q.

In some embodiments, the first electronic device 500 prompts (724) (e.g., an audio prompt played on a speaker or a visual prompt displayed on a display such as prompt 620 in FIGS. 6S and 6T) a selection of a user interface object. The first electronic device 500 receives (728) a selection of the first user interface object and, in accordance with receiving the selection of the first user interface object, determines (730) the first context information based on the first user interface object.

In some embodiments, the first electronic device 500 receives (740) second input on the first affordance (e.g., a press and hold input, such as input 614 in FIG. 6X) and, in response to the second input (742), stores (752) second context information in association with the first affordance. In such a case, the second context information is optionally related to a first action of the first electronic device 500, and the first context information is optionally related to a second action of the second electronic device 502 (754), as discussed above with respect to FIG. 6X.

In some embodiments, the bookmarked functionality to perform is optionally decided based on whether a second electronic device is connected to the first electronic device. For example, the first electronic device 500 optionally receives (756) third input on the first affordance of the first electronic device. In response to the third input (758), in accordance with a determination that first device selection criteria are met (e.g., the first device selection criteria are met if the first electronic device is not connected to the second electronic device 502), the first electronic device performs (760) the first action (e.g., the first electronic device starts playing audio from a preset radio station or performs another operation that is the first electronic device is capable of performing without a connection to the second electronic device). In accordance with a determination that second device selection criteria are met (e.g., the second device selection criteria are met if the first electronic device is connected to the second electronic device), the second electronic device performs (762) the second action (e.g., the first electronic device performs an operation that uses functionality of the second electronic device such as placing a phone call to a phone number using a cellular antenna of the second electronic device when the second electronic device is a cellular phone, or playing media stored on or streamed through the second electronic device). In some embodiments, when a third electronic device is connected to the first electronic device (instead of the second electronic device being connected to the first electronic device), in response to detecting an input on the first affordance, the first electronic device initiates performance of an operation that uses functionality of the third electronic device (e.g., initiating navigation to a predefined destination, placing a call to a different phone number using a cellular antenna of the third electronic device, or playing media stored on or streamed through the third electronic device). In some embodiments, a single affordance is optionally associated with different functionality on each of the first electronic device, the second electronic device, and the third electronic device, and a functionality is selected based on which device(s) are connected to the first electronic device. For example, functionality of the second electronic device is optionally selected if the second electronic device is connected to the first electronic device, functionality of the third electronic device is optionally selected if the third electronic device is connected to the first electronic device and the second electronic device is not connected to the first electronic device, and functionality of the third electronic device is optionally selected by default if neither the second nor the third electronic devices are connected to the first electronic device.

In some embodiments, the first electronic device 500 displays (706), on a display of the first electronic device, a first user interface, and the first input is received while the first user interface is displayed on the display of the first electronic device (714). The first context information is optionally requested from the second electronic device 502 in accordance with a determination that the first user interface is a user interface of an application of the second electronic device (720). In some embodiments, the second electronic device 502 responds to the request by indicating that there is nothing to bookmark in the current context. In such a case, the first electronic device 500 retains any context information already associated with the first affordance.

In some embodiments, in accordance with a determination that the first user interface is not a user interface of an application the second electronic device (as illustrated in FIG. 6X), the first electronic device 500 stores (764) second context information in association with the first affordance.

The second context information is optionally related to a first action of the first electronic device, and the first context information is optionally related to a second action of the second electronic device (766).

In some embodiments, the first electronic device 500 determines (768) a description based on the first context information (e.g., based on an application associated with a URI in the first context information). The first electronic device 500 then displays (772), on a display of the first electronic device, the description in association with the first affordance (e.g., the descriptions 622-630 in FIG. 6Y). In some embodiments, the first electronic device 500 receives (770) a description of the first context information from the second electronic device 502 before displaying the description.

The operations in the information processing methods described above are, optionally, implemented by running one or more functional modules in an information processing apparatus such as general purpose processors (e.g., as described above with respect to FIGS. 1A and 3) or application specific chips.

The operations described above with reference to FIGS. 7A-7D are, optionally, implemented by components depicted in FIGS. 1A-1B. For example, receiving operation 708, requesting operation 718, and storing operation 732 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

It should be understood that the particular order in which the operations in FIGS. 7A-7D have been described is merely exemplary and is not intended to indicate that the described order is the only order in which the operations could be performed. One of ordinary skill in the art would recognize various ways to reorder the operations described herein.

Figure 8:
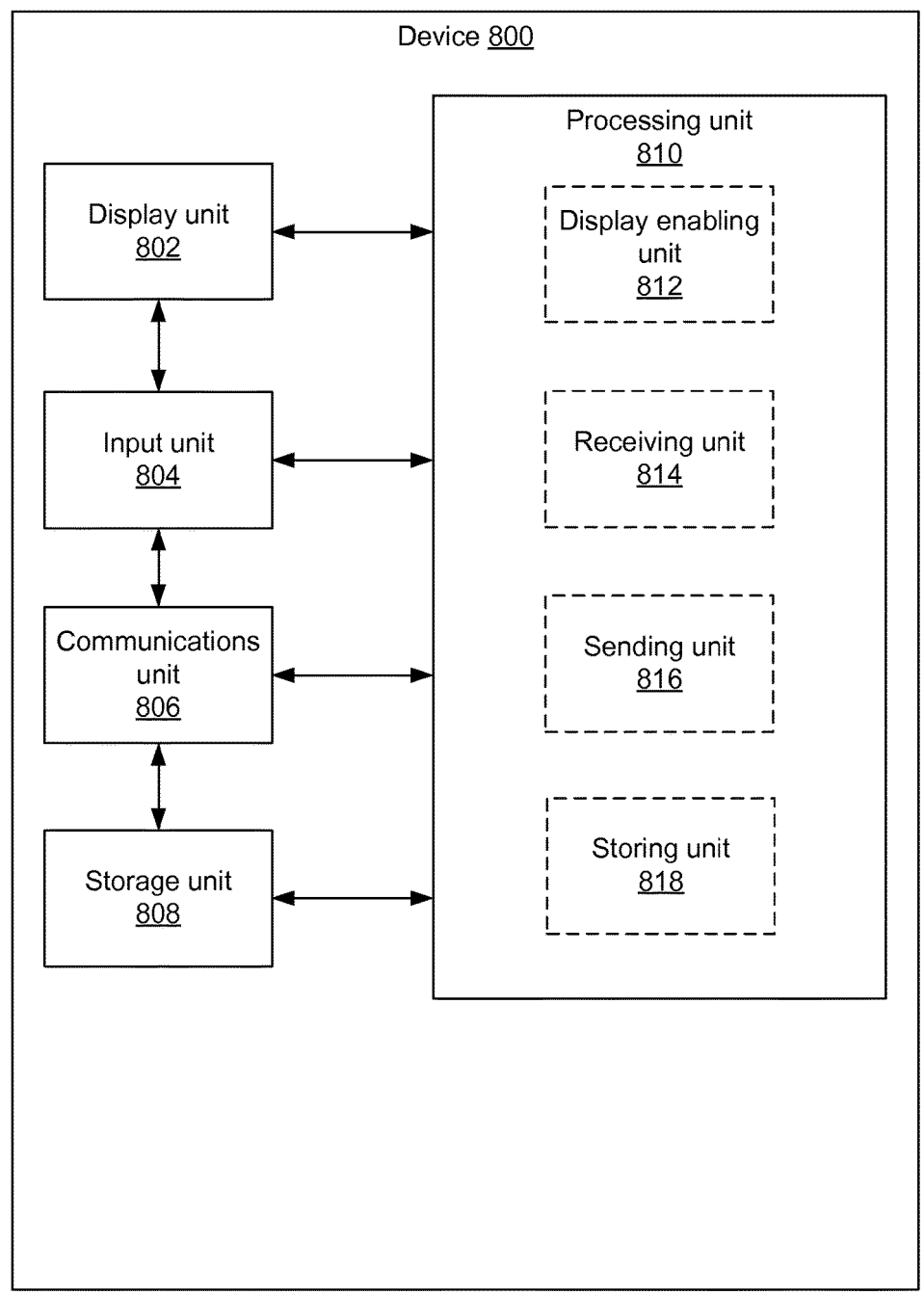
FIG. 8 shows a functional block diagram of an electronic device configured in accordance with the principles of the various described embodiments, in accordance with some embodiments.

In accordance with some embodiments, FIG. 8 shows a functional block diagram of a first electronic device 800 configured in accordance with principles of the various described embodiments. The functional blocks of the device are, optionally, implemented by hardware, software, or a combination of hardware and software to carry out the principles of the various described embodiments. It is understood by persons of skill in the art that the functional blocks described in FIG. 8 are, optionally, combined or separated into sub-blocks to implement the principles of the various described embodiments. Therefore, the description herein optionally supports any possible combination or separation or further definition of the functional blocks described herein.

As shown in FIG. 8, a first electronic device 800 optionally includes a display unit 802 configured to display a user interface (e.g., user interface objects such as buttons, icons, headings, etc.); an input unit 804 to receive user input, selections, etc. (e.g., touch-sensitive surface, affordances, buttons, keyboard, mouse, or other input unit); a communications unit 806 to send and receive data from additional electronic devices (e.g., a Bluetooth controller or other wireline or wireless controllers, etc.); and a storage unit 808 to store data (e.g., non-volatile memory or other storage). In some embodiments, the processing unit 810 optionally includes a display enabling unit 812, a receiving unit 814, a sending unit 816, and a storing unit 818.

In some embodiments, the processing unit 810 is configured to receive (e.g., with the receiving unit 814) first input on a first affordance of the first electronic device 800. In response to the first input, the processing unit 810 is configured to request (e.g., with sending unit 816) first context information from a second electronic device in communication with the first electronic device. The processing unit 810 is configured to store (e.g., with the storing unit 818) the first context information in association with the first affordance.

In some embodiments, the processing unit 810 is further configured to receive (e.g., with the receiving unit 814) second input on the first affordance of the first electronic device 800, and, in response to the second input, to send (e.g., with sending unit 816) the first context information stored in association with the first affordance to the second electronic device, and to display (e.g., with the display enabling unit 812) a user interface associated with the first context information.

In some embodiments, the processing unit 810 is further configured to display (e.g., with the display enabling unit 812), on a display of the first electronic device 800, a user interface of a first application, wherein the first input is received while the user interface of the first application is displayed on the display of the first electronic device 800, and, further in response to the second input, to cause (e.g., with sending unit 816) the second electronic device to launch an application.

In some embodiments, the processing unit 810 is further configured to receive (e.g., with the receiving unit 814) second input on the first affordance of the first electronic device 800, wherein the first electronic device 800 is in communication with a third electronic device, different from the second electronic device, and, in response to the second input, to send (e.g., with sending unit 816) the first context information stored in association with the first affordance to the third electronic device, and to display (e.g., with the display enabling unit 812) a user interface associated with the first context information.

In some embodiments, the processing unit 810 is further configured to display (e.g., with the display enabling unit 812), on a display of the first electronic device 800, a first user interface object. The first input is optionally received while the first user interface object is displayed on the display of the first electronic device, and the first context information is optionally related to an action associated with the first user interface object.

In some embodiments, the processing unit 810 is further configured to, further in response to the first input, determine that the first user interface object is selected, and, in accordance with the determination that the first user interface object is selected, to determine the first context information based on the first user interface object.

In some embodiments, the processing unit 810 is further configured to, further in response to the first input, prompt (e.g., with the display enabling unit 812) a selection of a user interface object, to receive (e.g., with the receiving unit 814) a selection of the first user interface object, and, in accordance with receiving the selection of the first user interface object, to determine the first context information based on the first user interface object.

In some embodiments, the processing unit 810 is further configured to receive (e.g., with the receiving unit 814) second input on the first affordance, and, in response to the second input, to store (e.g., with the storing unit 818) second context information in association with the first affordance. The second context information is optionally related to a first action of the first electronic device 800, and the first context information is optionally related to a second action of the second electronic device.

In some embodiments, the processing unit 810 is further configured to receive (e.g., with the receiving unit 814) third input on the first affordance of the first electronic device 800, and, in response to the third input, in accordance with a determination that first device selection criteria are met, to cause (e.g., with the display enabling unit 812) the first electronic device to perform the first action, and, in accordance with a determination that second device selection criteria are met, to cause (e.g., with sending unit 816) the second electronic device to perform the second action.

In some embodiments, the processing unit 810 is further configured to display (e.g., with the display enabling unit 812), on a display of the first electronic device 800, a first user interface, wherein the first input is received while the first user interface is displayed on the display of the first electronic device 800. The first context information is optionally requested from the second electronic device in accordance with a determination that the first user interface is a user interface of an application of the second electronic device.

In some embodiments, the processing unit 810 is further configured to, in accordance with a determination that the first user interface is not a user interface of an application the second electronic device, store (e.g., with the storing unit 818) second context information in association with the first affordance. The second context information is optionally related to a first action of the first electronic device 800, and the first context information is optionally related to a second action of the second electronic device.

In some embodiments, the processing unit 810 is further configured to determine a description based on the first context information, and to display (e.g., with the display enabling unit 812), on a display of the first electronic device 800, the description in association with the first affordance.

In some embodiments, the processing unit 810 is further configured to receive (e.g., with the receiving unit 814) a description of the first context information from the second electronic device, and to display (e.g., with the display enabling unit 812), on a display of the first electronic device, the description in association with the first affordance.

In some embodiments, the first context information is a uniform resource identifier (URI). In some embodiments, the first context information is a binary blob generated by the second electronic device.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A non-transitory computer readable storage medium storing one or more programs, the one or more programs comprising instructions, which when executed by a first electronic device with one or more processors and memory, cause the first electronic device to perform a method comprising:
   receiving first input on a first affordance of the first electronic device;
   in response to the first input, requesting first context information from a second electronic device in communication with the first electronic device, wherein the second electronic device is separate from the first electronic device; and
   storing the first context information in association with the first affordance, wherein:
      receiving the first input on the first affordance of the first electronic device occurs while a current activity of an application running on the second electronic device is being performed, and
      the first context information is indicative of the current activity of the application running on the second electronic device.

2. The non-transitory computer readable storage medium of claim 1, the method further comprising:
   receiving second input on the first affordance of the first electronic device;
   in response to the second input:
      sending the first context information stored in association with the first affordance to the second electronic device; and
      displaying a user interface associated with the first context information.

3. The non-transitory computer readable storage medium of claim 2, the method further comprising:
   displaying, on a display of the first electronic device, a user interface of a first application, wherein the first input is received while the user interface of the first application is displayed on the display of the first electronic device; and
   further in response to the second input, causing the second electronic device to launch an application.

4. The non-transitory computer readable storage medium of claim 1, the method further comprising:
   receiving second input on the first affordance of the first electronic device, wherein the first electronic device is in communication with a third electronic device, different from the second electronic device;
   in response to the second input:
      sending the first context information stored in association with the first affordance to the third electronic device; and
      displaying a user interface associated with the first context information.

5. The non-transitory computer readable storage medium of claim 1, the method further comprising:
   displaying, on a display of the first electronic device, a first user interface object;
   wherein the first input is received while the first user interface object is displayed on the display of the first electronic device; and wherein the first context information is related to an action associated with the first user interface object.

6. The non-transitory computer readable storage medium of claim 5, the method further comprising:
further in response to the first input, determining that the first user interface object is selected; and
in accordance with the determination that the first user interface object is selected, determining the first context information based on the first user interface object.

7. The non-transitory computer readable storage medium of claim 5, the method further comprising:
further in response to the first input, prompting a selection of a user interface object;
receiving a selection of the first user interface object; and
in accordance with receiving the selection of the first user interface object, determining the first context information based on the first user interface object.

8. The non-transitory computer readable storage medium of claim 1, the method further comprising:
receiving second input on the first affordance; and
in response to the second input, storing second context information in association with the first affordance;
wherein the second context information is related to a first action of the first electronic device, and the first context information is related to a second action of the second electronic device.

9. The non-transitory computer readable storage medium of claim 8, the method further comprising:
receiving third input on the first affordance of the first electronic device;
in response to the third input:
in accordance with a determination that first device selection criteria are met, causing the first electronic device to perform the first action; and
in accordance with a determination that second device selection criteria are met, causing the second electronic device to perform the second action.

10. The non-transitory computer readable storage medium of claim 1, the method further comprising:
displaying, on a display of the first electronic device, a first user interface, wherein the first input is received while the first user interface is displayed on the display of the first electronic device;
wherein the first context information is requested from the second electronic device in accordance with a determination that the first user interface is a user interface of an application of the second electronic device.

11. The non-transitory computer readable storage medium of claim 10, the method further comprising:
in accordance with a determination that the first user interface is not a user interface of an application the second electronic device, storing second context information in association with the first affordance;
wherein the second context information is related to a first action of the first electronic device, and the first context information is related to a second action of the second electronic device.

12. The non-transitory computer readable storage medium of claim 1, the method further comprising:
determining a description based on the first context information; and
displaying, on a display of the first electronic device, the description in association with the first affordance.

13. The non-transitory computer readable storage medium of claim 1, the method further comprising:
receiving a description of the first context information from the second electronic device; and displaying, on a display of the first electronic device, the description in association with the first affordance.

14. The non-transitory computer readable storage medium of claim 1, wherein the first context information is a uniform resource identifier (URI).

15. The non-transitory computer readable storage medium of claim 1, wherein the first context information is a binary blob generated by the second electronic device.

16. A first electronic device, comprising:
one or more processors;
memory; and
one or more programs, wherein the one or more programs are stored in the memory and configured to be executed by the one or more processors, the one or more processors including instructions for:
receiving first input on a first affordance of the first electronic device;
in response to the first input, requesting first context information from a second electronic device in communication with the first electronic device, wherein the second electronic device is separate from the first electronic device; and
storing the first context information in association with the first affordance, wherein:
receiving the first input on the first affordance of the first electronic device occurs while a current activity of an application running on the second electronic device is being performed, and
the first context information is indicative of the current activity of the application running on the second electronic device.

17. The first electronic device of claim 16, wherein the one or more programs further include instructions for:
receiving second input on the first affordance of the first electronic device; in response to the second input:
sending the first context information stored in association with the first affordance to the second electronic device; and
displaying a user interface associated with the first context information.

18. The first electronic device of claim 17, wherein the one or more programs further include instructions for:
displaying, on a display of the first electronic device, a user interface of a first application, wherein the first input is received while the user interface of the first application is displayed on the display of the first electronic device; and
further in response to the second input, causing the second electronic device to launch an application.

19. The first electronic device of claim 16, wherein the one or more programs further include instructions for:
receiving second input on the first affordance of the first electronic device, wherein the first electronic device is in communication with a third electronic device, different from the second electronic device;
in response to the second input:
sending the first context information stored in association with the first affordance to the third electronic device; and
displaying a user interface associated with the first context information.

20. The first electronic device of claim 16, wherein the one or more programs further include instructions for:
displaying, on a display of the first electronic device, a first user interface object;

wherein the first input is received while the first user interface object is displayed on the display of the first electronic device; and wherein the first context information is related to an action associated with the first user interface object.

21. The first electronic device of claim 20, wherein the one or more programs further include instructions for:

further in response to the first input, determining that the first user interface object is selected; and in accordance with the determination that the first user interface object is selected, determining the first context information based on the first user interface object.

22. The first electronic device of claim 20, wherein the one or more programs further include instructions for:

further in response to the first input, prompting a selection of a user interface object;

receiving a selection of the first user interface object; and in accordance with receiving the selection of the first user interface object, determining the first context information based on the first user interface object.

23. The first electronic device of claim 16, wherein the one or more programs further include instructions for:

receiving second input on the first affordance; and in response to the second input, storing second context information in association with the first affordance;

wherein the second context information is related to a first action of the first electronic device, and the first context information is related to a second action of the second electronic device.

24. The first electronic device of claim 23, wherein the one or more programs further include instructions for:

receiving third input on the first affordance of the first electronic device;

in response to the third input:

in accordance with a determination that first device selection criteria are met, causing the first electronic device to perform the first action; and in accordance with a determination that second device selection criteria are met, causing the second electronic device to perform the second action.

25. The first electronic device of claim 16, wherein the one or more programs further include instructions for:

displaying, on a display of the first electronic device, a first user interface, wherein the first input is received while the first user interface is displayed on the display of the first electronic device;

wherein the first context information is requested from the second electronic device in accordance with a determination that the first user interface is a user interface of an application of the second electronic device.

26. The first electronic device of claim 25, wherein the one or more programs further include instructions for:

in accordance with a determination that the first user interface is not a user interface of an application the second electronic device, storing second context information in association with the first affordance;

wherein the second context information is related to a first action of the first electronic device, and the first context information is related to a second action of the second electronic device.

27. The first electronic device of claim 16, wherein the one or more programs further include instructions for:

determining a description based on the first context information; and displaying, on a display of the first electronic device, the description in association with the first affordance.

28. The first electronic device of claim 16, wherein the one or more programs further include instructions for:

receiving a description of the first context information from the second electronic device; and displaying, on a display of the first electronic device, the description in association with the first affordance.

29. The first electronic device of claim 16, wherein the first context information is a uniform resource identifier (URI).

30. The first electronic device of claim 16, wherein the first context information is a binary blob generated by the second electronic device.

31. A method comprising:

at a first electronic device with one or more processors and memory:

receiving first input on a first affordance of the first electronic device;

in response to the first input, requesting first context information from a second electronic device in communication with the first electronic device, wherein the second electronic device is separate from the first electronic device; and storing the first context information in association with the first affordance, wherein:

receiving the first input on the first affordance of the first electronic device occurs while a current activity of an application running on the second electronic device is being performed, and the first context information is indicative of the current activity of the application running on the second electronic device.

32. The method of claim 31, the method further comprising:

receiving second input on the first affordance of the first electronic device;

in response to the second input:

sending the first context information stored in association with the first affordance to the second electronic device; and displaying a user interface associated with the first context information.

33. The method of claim 32, the method further comprising:

displaying, on a display of the first electronic device, a user interface of a first application, wherein the first input is received while the user interface of the first application is displayed on the display of the first electronic device; and further in response to the second input, causing the second electronic device to launch an application.

34. The method of claim 31, the method further comprising:

receiving second input on the first affordance of the first electronic device, wherein the first electronic device is in communication with a third electronic device, different from the second electronic device;

in response to the second input:

sending the first context information stored in association with the first affordance to the third electronic device; and displaying a user interface associated with the first context information.

35. The method of claim 31, the method further comprising:

displaying, on a display of the first electronic device, a first user interface object;

wherein the first input is received while the first user interface object is displayed on the display of the first electronic device; and wherein the first context information is related to an action associated with the first user interface object.

36. The method of claim 35, the method further comprising:

further in response to the first input, determining that the first user interface object is selected; and in accordance with the determination that the first user interface object is selected, determining the first context information based on the first user interface object.

37. The method of claim 35, the method further comprising:

further in response to the first input, prompting a selection of a user interface object;

receiving a selection of the first user interface object; and in accordance with receiving the selection of the first user interface object, determining the first context information based on the first user interface object.

38. The method of claim 31, the method further comprising:

receiving second input on the first affordance; and in response to the second input, storing second context information in association with the first affordance;

wherein the second context information is related to a first action of the first electronic device, and the first context information is related to a second action of the second electronic device.

39. The method of claim 31, the method further comprising:

receiving third input on the first affordance of the first electronic device;

in response to the third input:

in accordance with a determination that first device selection criteria are met, causing the first electronic device to perform the first action; and in accordance with a determination that second device selection criteria are met, causing the second electronic device to perform the second action.

40. The method of claim 31, the method further comprising:

displaying, on a display of the first electronic device, a first user interface, wherein the first input is received while the first user interface is displayed on the display of the first electronic device;

wherein the first context information is requested from the second electronic device in accordance with a determination that the first user interface is a user interface of an application of the second electronic device.

41. The method of claim 33, the method further comprising:

in accordance with a determination that the first user interface is not a user interface of an application the second electronic device, storing second context information in association with the first affordance;

wherein the second context information is related to a first action of the first electronic device, and the first context information is related to a second action of the second electronic device.

42. The method of claim 31, the method further comprising:

determining a description based on the first context information; and displaying, on a display of the first electronic device, the description in association with the first affordance.

43. The method of claim 31, the method further comprising:

receiving a description of the first context information from the second electronic device; and displaying, on a display of the first electronic device, the description in association with the first affordance.

44. The method of claim 31, wherein the first context information is a uniform resource identifier (URI).

45. The method of claim 31, wherein the first context information is a binary blob generated by the second electronic device.

* * * * *